US012717300B2

(12) United States Patent
O'Nien et al.

(10) Patent No.: US 12,717,300 B2
(45) Date of Patent: Aug. 25, 2026

(54) MEASURING AND/OR CONTROL SYSTEM FOR OPTIMIZING ENVIRONMENTAL-RELEVANT ENERGY CONSUMPTION IN PRODUCTION PROCESSES OF PLANTS OR INDUSTRIAL SITES AND/OR MEASURING SYSTEM FOR AUTOMATED MEASURING OF ENVIRONMENTAL QUANTIFICATION MEASURANDS

(71) Applicant: Bühler AG, Uzwil (CH)

(72) Inventors: Jay O'Nien, St. Gallen (CH); Giulia Manzolini, Zürich (CH); Urs Duebendorfer, Niederuzwil (CH); Adrian Ribi, Wil (CH); Alexis Noël, Winterthur (CH)

(73) Assignee: BÜHLER AG, Uzwil (CH)

( * ) Notice: Subject to any disclaimer, the term of this patent is extended or adjusted under 35 U.S.C. 154(b) by 355 days.

(21) Appl. No.: 18/578,368

(22) PCT Filed: Jul. 11, 2022

(86) PCT No.: PCT/EP2022/069334

§ 371 (c)(1),
(2) Date: Jan. 11, 2024

(87) PCT Pub. No.: WO2023/285389

PCT Pub. Date: Jan. 19, 2023

(65) Prior Publication Data

US 2024/0295863 A1 Sep. 5, 2024

(30) Foreign Application Priority Data

Jul. 12, 2021 (EP) .................................... 21185050

(51) Int. Cl.
*G05B 19/05* (2006.01)
*G06Q 10/0637* (2023.01)
*G06Q 30/018* (2023.01)

(52) U.S. Cl.
CPC ......... *G05B 19/058* (2013.01); *G05B 19/054* (2013.01); *G06Q 10/06375* (2013.01); *G06Q 30/018* (2013.01)

(58) Field of Classification Search
CPC ................ G05B 19/054; G05B 19/058; G06Q 10/06375; G06Q 10/0639; G06Q 30/18; G06Q 50/04; Y02P 90/84
See application file for complete search history.

(56) References Cited

U.S. PATENT DOCUMENTS 5,861,316 A * 1/1999 Cage .................... G01N 1/2211 95/219
2011/0144791 A1 6/2011 Loldj et al.
(Continued)

FOREIGN PATENT DOCUMENTS

JP 6199134 B2 * 9/2017 ............. G06Q 50/00

OTHER PUBLICATIONS

Shammsuzzaman et al. Effective Monitoring of Carbon Emissions from Industrial Sector Using Statistical Process Control, Applied Energy, Jul. 12, 2021, p. 1-13. (Year: 2021).*
(Continued)

*Primary Examiner* — Kidest Worku
(74) *Attorney, Agent, or Firm* — XSENSUS LLP

(57) ABSTRACT

Proposed is a control device (10) for optimizing energy management and energy monitoring of an industrial site (1) and measurement of an environmental footprint of an industrial site or plant (1) and/or of a product (2) manufactured or processed by said industrial site (1), the industrial site (1) comprising one or more processing units (12) for processing
(Continued)

or manufacturing one or more products (2) and said control device (10) comprising measuring devices and sensors (13) capturing measuring parameters at the processing units (12) and/or environmental measuring parameters associated with the industrial site (1), input/output interfaces (1011) and data transmission lines/networks (1012) to transfer the measured parameters to the control device (10). This can also include raw material scenarios of different sources, specific production practices (e.g. fertilizer use), and different environmental impact metrics, such as water and land use.

13 Claims, 27 Drawing Sheets

(56) References Cited

U.S. PATENT DOCUMENTS

| | | | | |
|---|---|---|---|---|
| 2011/0313666 | A1* | 12/2011 | Hirvi | A01G 2/00 702/2 |
| 2012/0150756 | A1* | 6/2012 | Belady | G06Q 30/018 705/317 |
| 2013/0179078 | A1* | 7/2013 | Griffon | G06Q 50/26 702/3 |
| 2016/0055596 | A1* | 2/2016 | Dilip | G06Q 30/018 705/30 |
| 2020/0275617 | A1* | 9/2020 | Fabijanski | A01G 22/00 |

OTHER PUBLICATIONS

International Search Report and Written Opinion mailed on Nov. 24, 2022, received for PCT Application PCT/EP2022/069334, filed on Jul. 11, 2022, 14 pages.

* cited by examiner

Scope 1 (on-site)

Scope 2 (off-site)

Scope 3

Legend: Recommended | Discretionary

Fuel combustion (e.g. boilers, furnaces)

Owned transport (e.g. trucks, cars)

Process emissions (e.g. waste processing)

Fugitive emissions (e.g. air conditioning, leaks)

Consumption of purchased electricity, heat, steam and cooling

Purchased materials & fuels (e.g. extraction & production)

Transport activities (e.g. commuting, business travel)

Leased assets, franchising and out sourcing

Sold goods and services

- Scope 3 is optional, therefore only scope 1 and 2 will be assessed
- Define functional unit (e.g. ton flour)
- Define System boundaries & activities (e.g. offices, manufacturing)

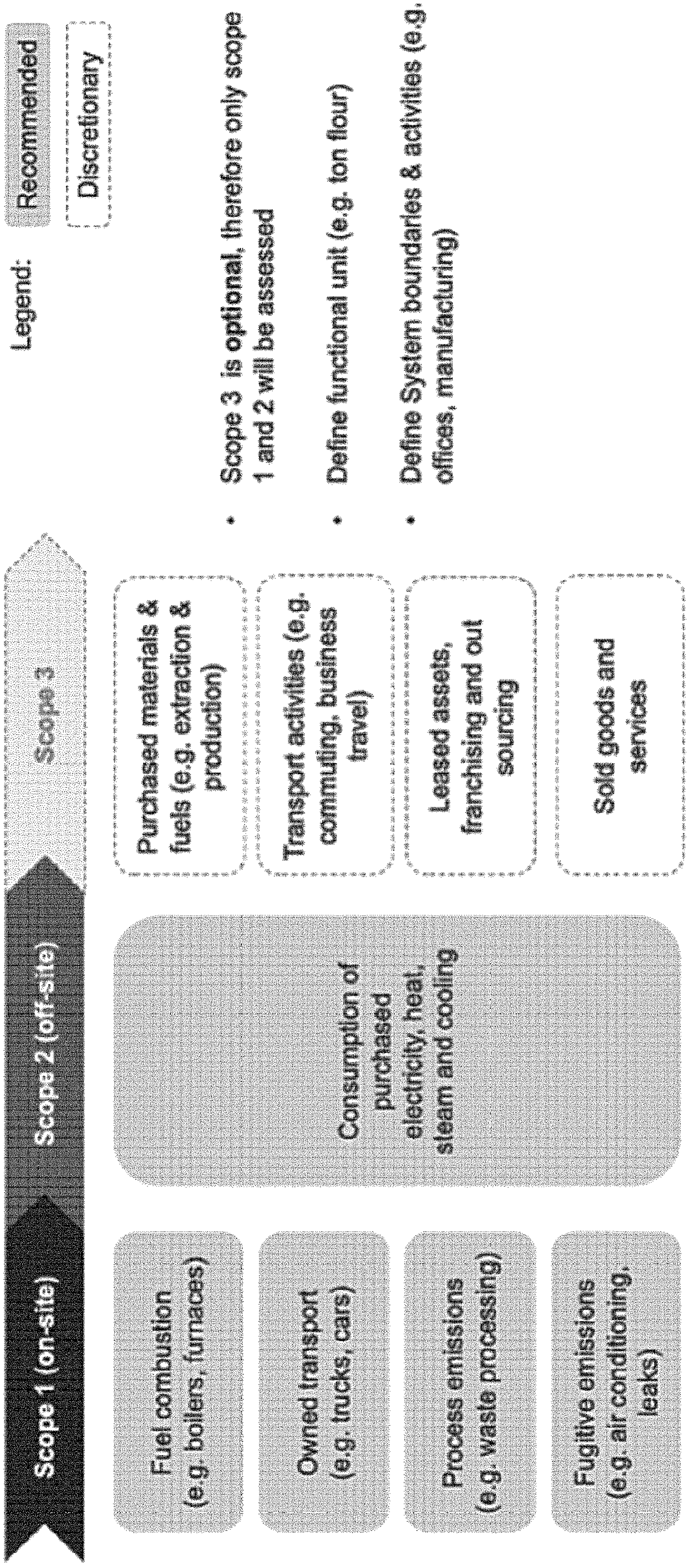

Fig. 9

| | | | |
|---|---|---|---|
| **Absolute emissions:** 2,000 tonnes CO2e / year | | | |
| **Ratio indicator:** 0.5 kg CO2e / kg part* | | | |
| Factory | 1,800 | Scope 1 | 3,000 |
| Office | 200 | Scope 2 | 0 |

*average sold part

Scope 1 (on-site)

Scope 2 (off-site)

Scope 3

Legend:

Recommended

Discretionary

Fuel combustion (e.g. boilers, furnaces)

Owned transport (e.g. trucks, cars)

Process emissions (e.g. waste processing)

Fugitive emissions (e.g. air conditioning, leaks)

Consumption of purchased electricity, heat, steam and cooling

Purchased materials & fuels (e.g. extraction & production)

Transport activities (e.g. commuting, business travel)

Leased assets, franchising and out sourcing

Sold goods and services

- Quantify Scope 1 & 2 footprint
- Scope 3 is recommended. Product assessments provide key aspects of scope 3 assessment.
- Product assessments require functional unit (e.g. tonne flour), System boundaries & activities (e.g. offices, manufacturing)

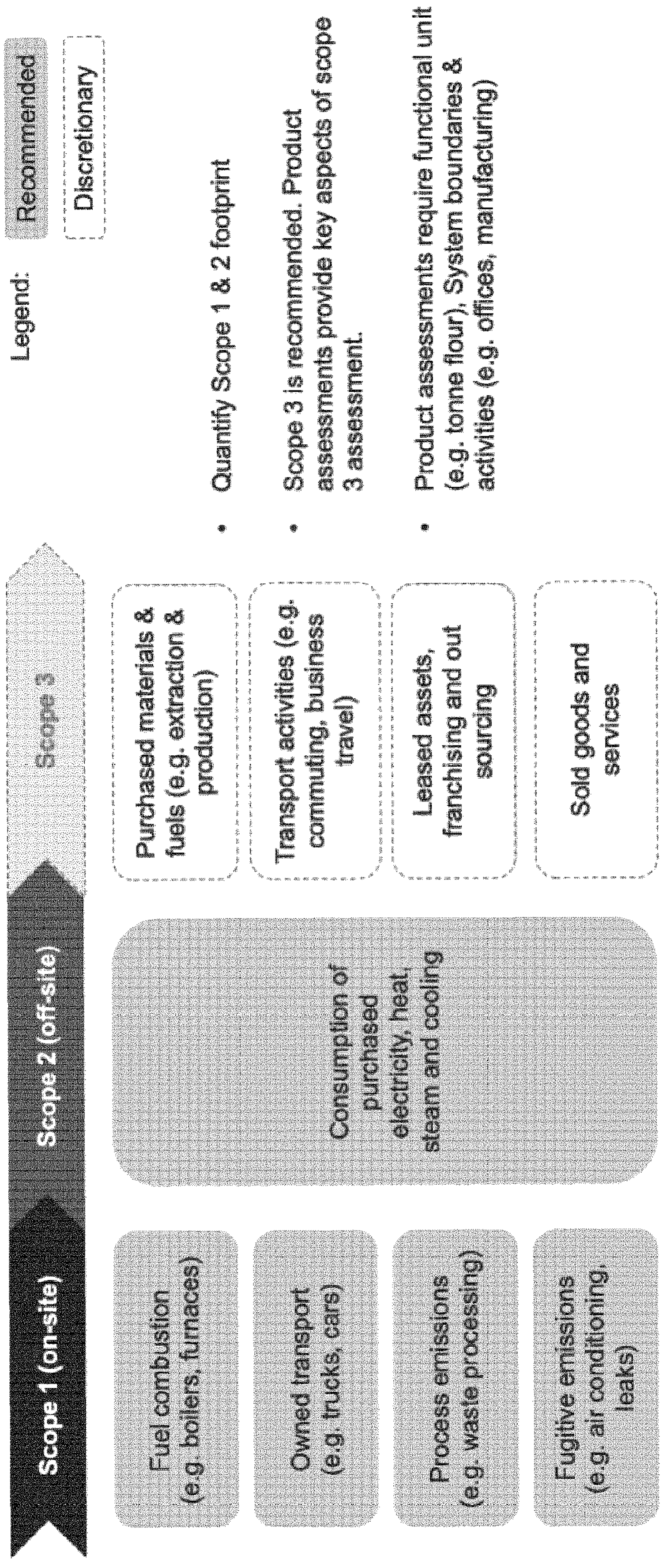

Fig. 14

| | | | |
|---|---|---|---|
| Ratio Indicator: **8 kg CO2e/tonne** of flour | | | |
| Absolute emissions: **3000 tonnes CO2e/year** | | | |
| Office | 150 | Scope 1 | 500 |
| Factory | 2700 | Scope 2 | 2500 |

Purpose:

- Avoid climate change (GHGs emissions) tunnel vision
- Use tangible and transparent metrics (m2a;m3 eq.)
- Holistic environmental impact assessments 1. Measure environmental impact.

2. Avoid creating adverse impacts or emissions with optimised processes.

3. Reduce footprint with informed decisions, e.g. comparing USD/Tonne CO2e.

4. Drawdown residual emissions with credible partners to achieve targets.

5. Communicate results credibly.

Environmental Quantification

Site Assessments

Product Assessments

Certifications

- Quantify scope 1 & 2 footprint in accordance with the Greenhouse Gas Protocol
- Understand biggest levers to reduce company CO2 Footprint

- Quantify the CO2e of product (other life-cycle metrics available)
- Engage supply chain to communicate CO2e Footprint
- Understand biggest levers to reduce product CO2 Footprint

- Certify quantifications to communicate results with confidence
- Demonstrate commitment to Sustainability

Fig. 21

Example of Reduction Measures

Tailored action plan example
Oven optimization

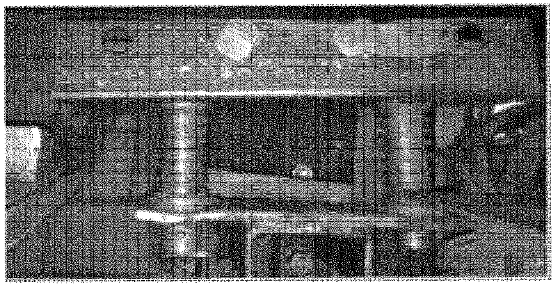

Repairs
- Repair/adjustment of cigar cutters
- Dampers – check & ensure moveable
- Turbo fan – check & cleaning
- Baking profile optimized to new settings

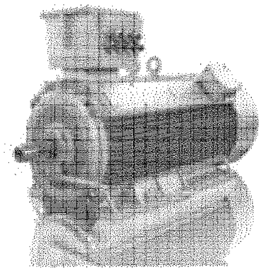

Upgrades
- Band / band guides / Burners
- New motors
- Spilt dampers, GAP control, re-circulation systems
- Spare part recommendations

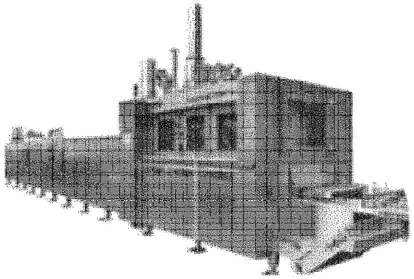

Training
- Ensure correct energy consumption with correct pressures / temperatures
- Enhanced safety
- Training of operators & maintenance set up

Fig. 22

Site Breakdown

5%

95%

Office Factory

Scope Breakdown

36%

64%

Scope 1 Scope 2

| Absolute emissions | 3'890 t $CO_2e$ / year) | | |
| --- | --- | --- | --- |
| Factory | xx | Scope 1 | xx |
| Office | xx | Scope 2 | xx |
| Ratio indicator | xx kg $CO_2e$ / tonne malt | | |

MEASURING AND/OR CONTROL SYSTEM FOR OPTIMIZING ENVIRONMENTAL-RELEVANT ENERGY CONSUMPTION IN PRODUCTION PROCESSES OF PLANTS OR INDUSTRIAL SITES AND/OR MEASURING SYSTEM FOR AUTOMATED MEASURING OF ENVIRONMENTAL QUANTIFICATION MEASURANDS

CROSS-REFERENCE TO RELATED APPLICATIONS

The present application is based on PCT filing PCT/EP2022/069334, filed on Jul. 11, 2022, which claims priority to European Patent Application No. 21185050.8, filed on Jul. 12, 2021, the entire contents of each are incorporated herein by its reference.

FIELD OF THE INVENTION

The present invention relates in general to measuring devices and optimized control and steering devices for optimizing of the environmental-relevant energy consumption in a production process of a plant or industrial sites by optimizing both electric and thermal energy in such a manner as to achieve desirable overall plant performance. In particular, the invention relates to automated measuring and/or control/steering devices, optimizing measurement and steering a plant in respect to its energy consumption in production processes of the plants or industrial sites, that improve energy facility efficiency and are applicable in technical areas (e.g., production processes), manufacturing industry (e.g., factories, plants, process lines), and tertiary areas (e.g., buildings, transportation etc.) for which it is desirable to reduce at least one of energy supply cost, $CO_2$ (carbon dioxide) emission, water, waste and primary energy consumption. Further, it relates to control and measuring systems directed to the measurement of environmental quantification measures.

BACKGROUND OF THE INVENTION

The emission of greenhouse gases, such as carbon dioxide ($CO_2$), methane ($CH_4$), and nitrous oxide ($N_2O$) due to human activities, in particular industrial production and manufacturing processes, is one of the major causes of climatic changes with impacts on food security and safety for their effects on agricultural crops. The fluxes of greenhouse gases are responsible for the increase in temperature, which will lead to higher drought stress for crops due to increased evapo-transpiration combined with a more uneven distribution of rainfall events. In addition, growing economic, social and environmental challenges are further driving new paradigms of sustainable development, in which competitive sustainable manufacturing (SM) plays a core role. Increasing energy and commodity prices with resource scarcity, government legislature and consumer pressure are driving environmentally conscious business strategy to gain sustainable advantage through effective energy product optimization and efficient resource consumption. Rising energy and labor costs further continue to increase the pressure to innovate. Thus, the reduction of energy consumption and greenhouse gas (GHG) emissions, mainly carbon dioxide ($CO_2$) emissions, are at the top of the global agenda.

In this context, it is a known fact that feed and food production contribute substantially to the emissions of greenhouse gases, which are known to cause said global warming with serious environmental and economic threads. In particular, industrial food and feed production processes, raw material processing and linked manufacturing operations are energy intensive where also used electricity is often generated by fossil fuels which is a major contributor of $CO_2$ emissions, water depletion, and land use. However, the enhancement of energy management in an industrial process requires robust, physical measuring parameter driven monitoring, measuring and modelling, as well as an appropriate selection of energy performance indicators (EnPI) providing a measure for the energy performance of the plant, process line or industrial process. Today, an effective energy management system (EMS) is recognized as a potential competitive advantage by many industries because it provides many benefits, such as energy consumption and cost reductions, improve and optimize environmental impact reduction.

The food industry is divided into several sectors. Among these, the wheat processing sector is considered as one of the most energy-intensive industry consumer because it requires high and regular energy supply. In flour milling, electricity accounts for almost 75% of total energy use and over 90% of energy costs with a consumption that varies between 361 MJ/t and 1186 MJ/t. Thus, inefficient energy use could lead to huge economic losses as excessive energy consumption adds to the costs of the goods produced. There are huge efforts for energy efficiency on food industry and wheat production, however, most of them focus mainly on marketing, production planning or quality of product. However, prior art systems related to optimizing energy consumption in this industry do not provide an adequate tool for energy management. Some of them are limited to monitor the energy requirement for operations involved in the processing of wheat while in others try to optimize the process of how to reduce the peak load and its associated costs. Other systems have been focusing on the recognition of the development of energy consumption patterns of the various unit operations required for the wheat processing plant. Further in all the prior art corresponding to milling plants, the EnPIs are based on simple models of energy consumption versus production without considering variables of the wheat production process that affect the energy consumption.

Many factors influence on energy requirements for the raw material transformation of wheat. Thus, systems, providing an efficient energy management should be able the take into account the correlation between energy consumption and the class of wheat, moisture content, feed rate, fast roll speed, roll speed differential and roll gap. Further, since wheat flour relies on proper conditioning to facilitate endosperm and bran separation, many mills add moisture to soften the grain improving efficiency in terms of the energy required to produce the flour. It is clear, that processing of natural resources depends on their composition. Therefore, it is important to an energy management system should be enabled to consider the relationship between energy efficiency and the properties of the raw material. The physical properties of wheat and technical exploitation parameters of grinding rolls have a direct influence on energy consumption of grinding as well. However, most prior art systems controlling the plant processes focus in the effect on product quality instead of the energy consumption. Thus, these systems typically consider the effects of normal and hard milling and different conditioning times on flour properties of wheat were studied, without considering the energy consumption.

Unseen the above discussed wheat processing sector, it has to be noted that in general that feed and food production can contribute substantially to the emissions of greenhouse gases. For example, livestock has a major share, causing 18% of the global greenhouse gas emissions. Subsequently, food with animal protein components, such as dairy (cheese: 8.8 kg $CO_2$e/kg cheese) and meat products (beef: 29.0 kg $CO_2$e/kg beef), show high greenhouse gas emissions. However, besides animal products, vegetables and cereals (tomato: 5.3 kg $CO_2$e/kg tomato; rice: 1.2 kg $CO_2$e/kg rice) can also generate high emissions. Greenhouse gas emissions could be reduced by the replacement of animal with plant components in foods. It is conceivable to use grain legumes, such as peas or beans, as such plant replacement components. Grain legumes, such as peas with a carbon footprint of 0.49 kg $CO_2$e/kg pea, have been suggested as a very efficient source of protein in terms of greenhouse gas (GHG) emissions per kg. Pea-based protein has proved to be very well suited for the fortification of pasta products and the improvement of techno-functional and sensorial properties, and thus could very well substitute animal-based ingredients of processed foods. It is to be noted that land-based production of high-quality protein by livestock, poultry and fish plays an important role in improving human nutrition, growth, and health, as well as economic and social developments worldwide. With exponential growth of the global population and marked rises in meat consumption per capita, demands for animal-source protein are expected to increase by 72% between 2013 and 2050. This raises concerns about the sustainability and environmental impacts of animal agriculture. A possible solution to meeting the increasing needs for animal products and mitigating undesired effects of agricultural practices is to enhance the efficiency of animal growth, reproduction, and lactation. However, though breeding techniques may help achieve this goal, they have only met with limited success. For example, comparing the environmental impact of producing 1 kg of edible protein from kidney beans, almonds, eggs, chicken and beef, for example, input parameter values have to be measured including land and water for raising animals and growing animal feed, total fuel, and total fertilizer and pesticide for growing the plant commodities, animal feed, and animal waste. As a result, to produce 1 kg of protein from kidney beans required approximately eighteen times less land, ten times less water, nine times less fuel, twelve times less fertilizer and ten times less pesticide in comparison to producing 1 kg of protein from beef. Compared with producing 1 kg of protein from chicken and eggs, beef generated five to six times more waste (manure) to produce 1 kg of protein. In summary, the substitution of beef with beans in meal patterns will significantly reduce the environmental footprint worldwide and should also be encouraged to reduce the prevalence of non-communicable chronic diseases.

Not every emissions of any greenhouse gases has the same effect. The different impacts of various greenhouse gases are measured in their global warming potential (GWP) which is the heat absorbed by a greenhouse gas in the atmosphere, as a multiple of the heat that would be absorbed by the same mass of carbon dioxide ($CO_2$). GWP is 1 for $CO_2$. For other gases, The GWP depends on the gas and the time frame. Carbon dioxide is used as the general reference. It has a GWP of 1 regardless of the time period used. $CO_2$ emissions cause increases in atmospheric concentrations of $CO_2$ that will last thousands of years. To compare the effects of the various greenhouse gases, a carbon dioxide equivalent ($CO_2$e (also referred to as $CO_2$eq or $CO_2$-e)) is defined from GWP. It is measured in weight or concentration. For any amount of any gas, it is the amount of $CO_2$ which would warm the earth as much as that amount of that gas. Thus it provides a common scale for measuring the climate effects of different gases. It is calculated as GWP times amount of the other gas. For example if a gas has GWP of 100, two tones of the gas have $CO_2$e of 200 tones, and 1 part per million of the gas in the atmosphere has $CO_2$e of 100 parts per million. As greenhouse gas (GHG) is a gas that absorbs and emits radiant energy within the thermal infrared range, causing the greenhouse effect. The primary greenhouse gases in Earth's atmosphere are water vapor ($H_2O$), carbon dioxide ($CO_2$), methane ($CH_4$), nitrous oxide ($N_2O$, i.e. laughing gas), and ozone (O3). Without greenhouse gases, the average temperature of Earth's surface would be about −18° C., rather than the present average of 15° C.

The prior art document US 2011/0144791 A1 shows a system for control, monitoring and recording of incoming chemical and power use, and emissions of electronic device manufacturing systems. According to US 2011/0144791 A1, the system is focused on so called sub-fab equipment which shall typically do not have monitoring data for energy consumption and/or energy savings. The sub-fab equipment, as defined by US 2011/0144791 A1, can comprise auxiliary devices as abatement tools, AC power distributors, primary vacuum pumps, spare vacuum pumps, water pumps, chillers, heat exchangers, process cooling water supplies and delivery sys-tems, electrical power supplies and delivery systems, inert gas dumps, valves, device controllers, clean dry air supplies and delivery systems, ambient air supplies and delivery sys-tems, inert gas supplies and delivery systems, fuel supplies and delivery systems, touch screens, process logic control-lers, reagent supplies and delivery systems, etc. Thus, US 2011/0144791 A1 proposed that the energy usage of sub-fab equipment is monitored by integrated sub-fab systems. By integrated sub-fab systems, the system is able to capture different depths of energy savings modes such as idle (shallow energy savings where production equipment can recover to normal production with no quality or throughput impact in seconds), sleep (deeper energy sav-ings where production equipment can recover in minutes), or hibernate (where production equipment may require hours to recover not to have impact on quality, or throughput). The system is also able to monitor and display all gas emissions in a sub-fab as well as the Semi S23 method reporting of CO2 equivalent emission. The system can monitor effluent process gases and energy use from a certain process tool and sub-fab equipment. Therefore, in principle, the system of US 2011/0144791 A1 proposes distinct measurements and monitoring at the different sub-fab equipment, to capture or measure the overall monitoring and recording of incoming chemical and power use of the complete fab-system.

SUMMARY OF THE INVENTION

It is an object of the present invention to provide a measuring and/or control system and method providing automated measuring and/or optimization of energy handling and/or minimization of the overall energy consumption in production processes of plants or industrial sites. It is an object of the present invention to provide a system and method for an intelligent control and/or measuring system or device with all the data required that enables automated and certified environmental quantification measuring e.g. by providing, inter alia, quantified $CO_2e$ measurands. Further, the system should be easy scalable and integratable to all kinds of third-parties' competitor/partner equipment. The system should be able to automatically collect relevant data and process the data to generate site environmental footprints and/or product environmental intensities and impact strength measurands. This can include measuring parameter values from a field/mine/value chain of the raw materials, such as specific emissions top produce wheat processed into flour. It should further be able to automatically, or at least semi-automatically provides improvement quantified measurands, considering and mutually weighting measured cost parameters, production or manufacturing measures and impact parameters against each other. Thus the present invention goes also beyond the technical approaches as provided by prior art systems in that the inventive measuring and control optimization system provides a technical structure automatically allowing to measure and contribute by automated control adaption optimization and steering the influence of a possible raw material footprint.

According to the present invention, these objects are achieved, particularly, by the features of the independent claims. In addition, further advantageous embodiments can be derived from the dependent claims and related descriptions.

According to the present invention, the above-mentioned objects related to optimizing energy consumption control, measurements and monitoring of an industrial site or plant and measurement of an environmental footprint of an industrial site/plant and/or of a product manufactured or processed by said industrial site by means of a control device are achieved, particularly, in that the industrial site comprises one or more processing units for processing or manufacturing one or more products and said control device comprising an input section comprising measuring devices and sensors capturing and/or monitoring and/or recording predefined measuring parameters via dataflow-pathways of the measuring devices and sensors at the processing units and/or environmental measuring parameters associated with the industrial site, input/output interfaces and data transmission lines/networks to transfer the measured parameters to the control device, wherein based upon the monitored measuring parameters value settings for optimizing the control, steering and/or monitoring of the environmental footprint-relevant energy consumption of the industrial site, in that the input section is configured to capture and/or monitor and/or record predefined measuring parameters triggering in the data-pathways of the measuring devices and sensors for the generation of value settings for optimizing the control and steering of the energy management of the industrial site, in that the monitored measuring parameters comprise parameter vectors wherein the parameter values of the parameter vectors are time series of parameter values changeable over an entire predetermined operation period, and/or parameter scalars, wherein the parameter values of the parameter scalars do not change throughout the entire operation period, and constructional parameters, wherein the constructional parameter values represent structural characteristics of the industrial site or plant, in that for the generation of the product environmental quantification measure value based on the monitored measuring parameters measuring a $CO_2e$, water depletion, and land use impact intensity/environmental impact strength value of the product processed or manufactured by the industrial site, emission factors are classified and monitored by life cycle stage, wherein the emission factors are classified (i) for emitted raw material, (ii) for emitted waste materials comprising emission factors for energy emission and emission factors for waste material emission, and (iii) for transport emissions, in that for waste material and production cycle material, the control device comprises a material detector detecting and/or determining materials of the product according to a weight of each material, an environmental impact measurement and analysis of each material and production process, wherein a product can include a plurality of materials, the material detector further determining a weight proportion which is a proportion of the weight of each material to the total weight of the product according to the weight analysis of each material, and determining an environmental measuring proportion (e.g. by measuring a $CO_2e$ value) which, for example, can be a proportion of the $CO_2e$ exhausted from each material to the total $CO_2e$ exhausted from the product in a life cycle according to the $CO_2e$ measurements of each material and the production process, and in that, based on the monitored measuring parameters, an environmental product quantification measurand value is generated measuring an environmental impact intensity or impact strength (e.g. comprising a $CO_2e$ impact intensity) of a product processed or manufactured by the industrial site and/or an industrial site environmental quantification measurand value is generated measuring a quantified environmental footprint of the industrial site or plant. The inventive system is enabled to provide environmental impact strength measurements/prediction/optimization with or without automated and/or optimized environmental relevant energy consumption control. The control device can be realized as in integrated part of the industrial site/or plant, thus, providing an industrial site/or plant with an autonomously and automatically electronic steering of the industrial site/or plant using PLC-interfaces and the like to the processing units of the industrial site/or plant. In particular, the measuring devices and sensory devices can be an integrated part of the measuring and control device, thus, the measuring and control device comprising said measuring devices and sensory devices as a part of its device structure.

As an embodiment variant, the measuring and/or control device can e.g. provide a dynamically adapted line configuration based on the optimized improvement measures. Based on the generated product impact strength quantification measure value (e.g. comprising a $CO_2e$ quantification measure value) and/or the measured industrial site environmental impact strength quantification measure value, the measuring and/or control and/or steering device can e.g. dynamically vary operational parameter of the industrial site or plant adapting the operation of the processing units of the industrial site or plant until a minimal measured value of the environmental footprint of the industrial site or plant and/or of the product processed by the industrial site or plant is reached. The operational parameters of the industrial site or plant can e.g. be dynamically varied by varying the operational parameters applying simulated annealing to the parameter space of the operational parameter. The operational parameters of the industrial site or plant can e.g. be dynamically varied by varying at least two of the operational parameters within the parameter space of the operational parameters and by applying the first deviation based on Box-Wilson data processing to minimize the measured environmental footprint of the industrial site and/or of a product. The at least two of the operational parameters within the parameter space can e.g. be stochastically or according to a smallest distance varied until an optimized environmental footprint measurand is measured. The at least two of the operational parameters within the parameter space can e.g.

be varied electronically until a predefined threshold value for the measured environmental footprint is triggered.

The invention has, inter alia, the advantage that it enables to provide an intelligent control system with all the data required providing automated and certified environmental impact strength quantification (e.g. comprising $CO_2$e quantification) that allows to integrate competitor and/or partner equipment, alike. The system automatically collects the required data, processes the measured and captured data, and generates a quantitative site environmental footprint measurand value. The system further is able to process the captured and measured data and generates a product and/or plant and/or industrial site environmental impact intensity and/or impact strength. The system further can automatically provide improvement appropriate measures considering cost and/or measures and/or impacts. The system is further able to generate added values through combination of sensors, intelligent control system, $CO_2$e quantification with process and sustainability knowledge. Further, it is able to provide third party certificates, as e.g. ISO Certificate. The system can provide controlled and secured access for customers/users to certificates e.g. based on an identification number or other authentication mechanisms. The system can provide a dynamic line configuration for the industrial site to optimize energy management. In addition, the system is able to ink to raw material database, logistics and key process parameters in a new inventive way. The system may also provide quality/$CO_2$e an unique, protected label that proves $CO_2$e certification. In particular, it allows certified measurements in accordance with any technical requirements or regulatory standards, as e.g., given by the standards of the Greenhouse Gas Protocol initiated by the World Resources Institute (WRI) and the World Business Council for Sustainable Development (WBCSD). Finally, the system can integrate block-chain technology to provide said certifications or a trusted lawyer interaction. The integration of the block-chain technology allows the implementation of a controlled multi-layer trust structure in order to operate the inventive control system as a system of trust. In this embodiment variant, the design of the used blockchain technology allows to incorporate three interacting trust layers: a social layer capturing the way actors interact with one another and determine how much information they need, and in what form in order to be able to trust and take action on the basis of the trusted information, e.g. the $CO_2$e certification; a records or data layer that supplies the information that the actors have decided they need to obtain from the control system to give them confidence to act; and a technical layer, capturing the technical means by which the actors interact and create, store and obtain information about those interactions as tamper-resistant and non-repudiable proof of facts about acts, i.e. the $CO_2$e measurement. Though, the primary focus of the present invention is on the records layer; however, to understand this layer, and the means by which the environmental certification, e.g. comprising a $CO_2$e certification) can be managed by the implemented blockchain-based records effectively, it is important to understand the other two layers and, to some extent, how the layers interact with one another in the design and operation of blockchain systems.

BRIEF DESCRIPTION OF THE DRAWINGS

The present invention will be explained in more detail by way of example in reference to the drawings in which:

FIGS. 2 to 8 are based on an exemplary product assessment in a die casting process by the inventive system 1.

| Raw Material | Manufacture | Transport |
|---|---|---|
| Magnesium alloy, EUR<br>Aluminum alloy, EUR<br>Water, EUR<br>Lubricating oil, EUR | Energy<br>Electricity (high voltage), EUR<br>Heat (from natural gas), GLO<br>Waste<br>Aluminum recycling, EUR<br>Sludge incineration, EUR | Transport by truck, EUR<br>Transport by ship, GLO |

Figure 3:
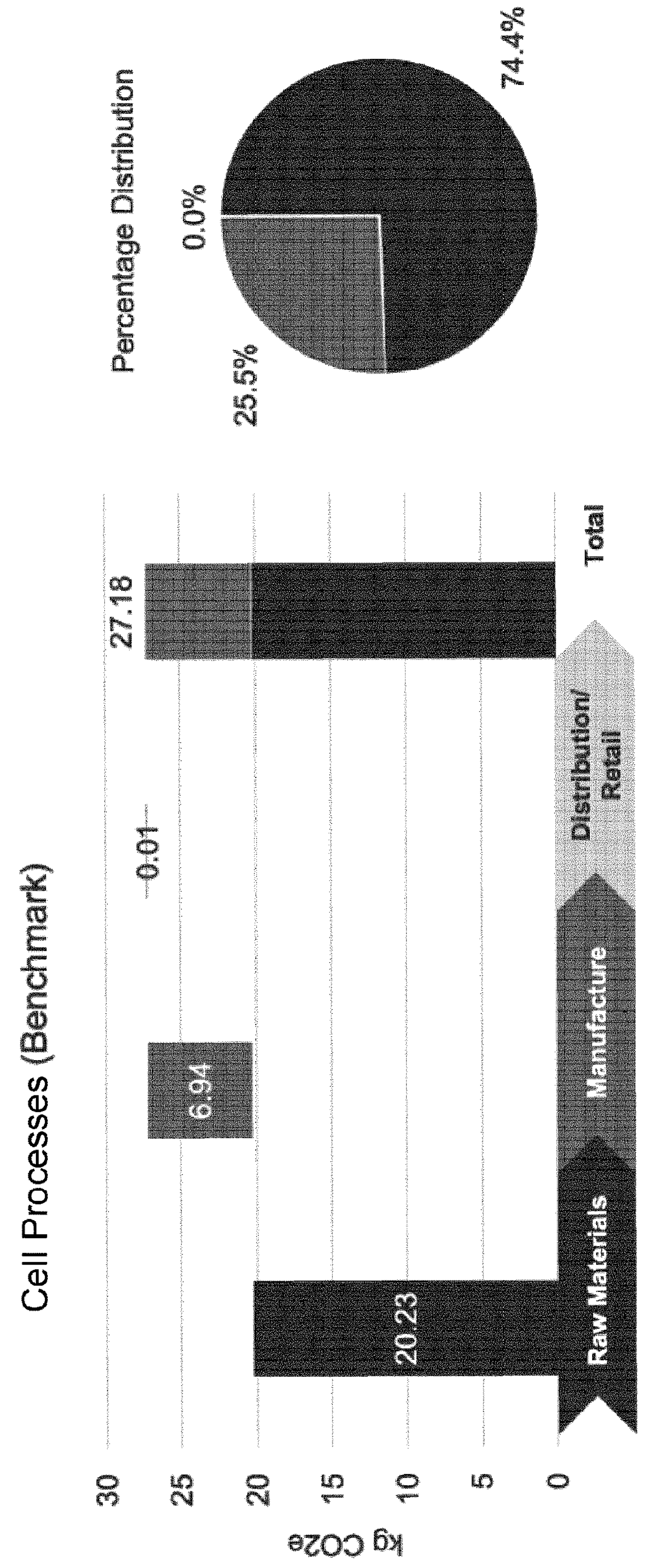

FIG. 3 shows a diagram illustrating schematically an exemplary $CO_2$e distribution for 1 kg aluminum die casted part.

Figure 4:
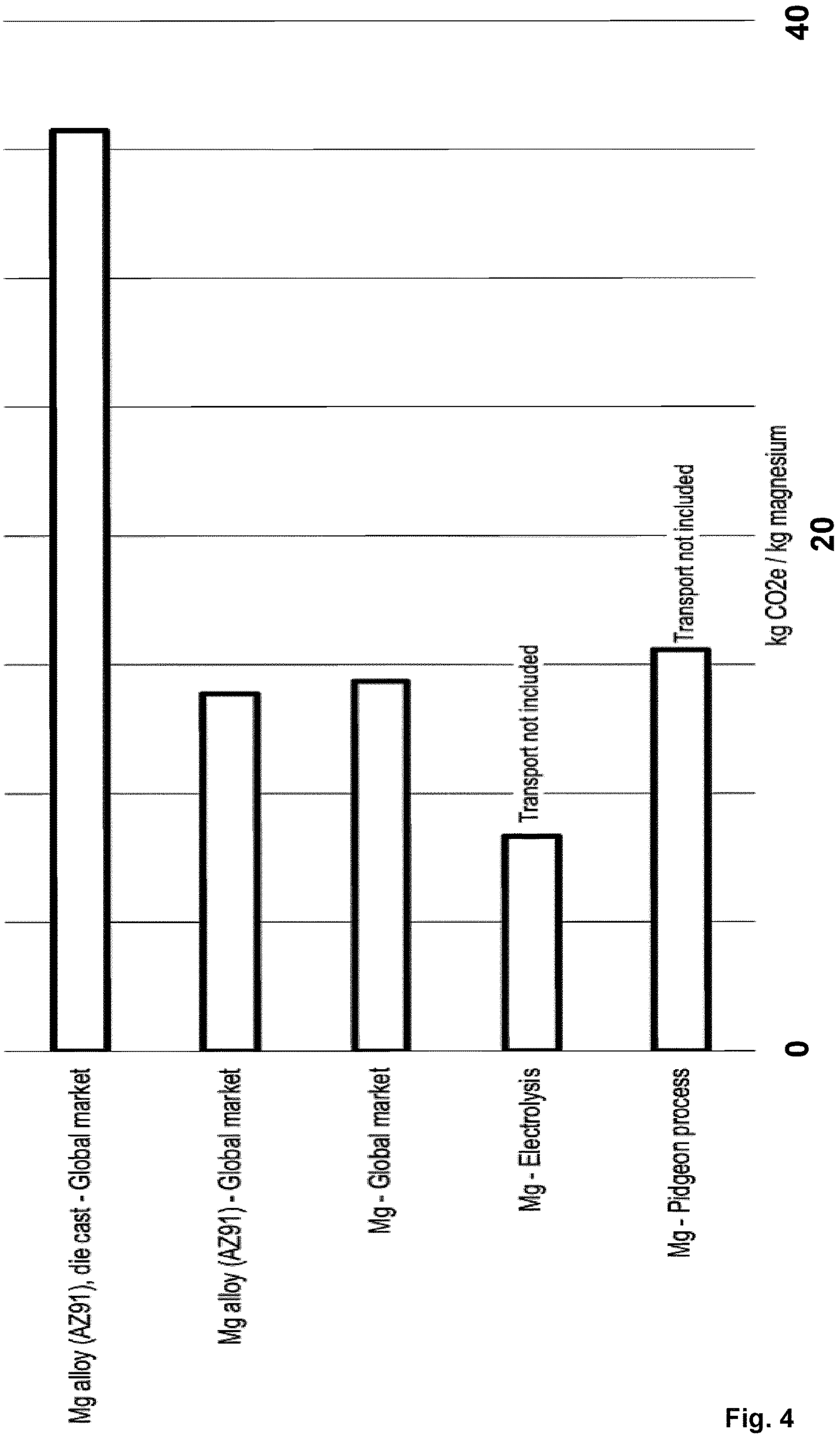

FIG. 4 shows a diagram illustrating schematically an exemplary table with aluminum emission factors. It can be seen in FIG. 4 that the aluminum sourcing may significantly impacts the final footprint.

Figure 5:
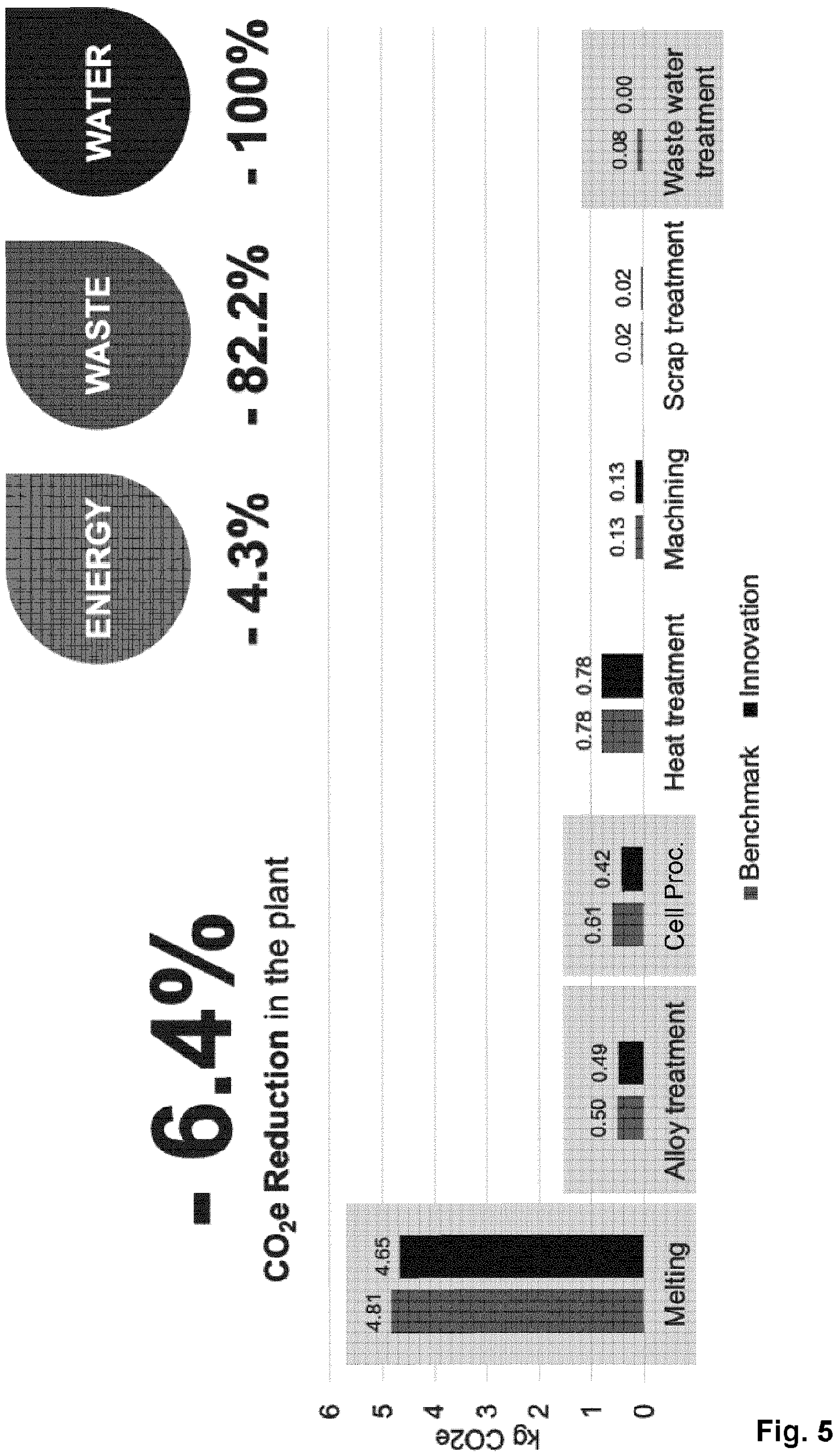

FIG. 5 shows a diagram illustrating schematically the measured and/or predicted savings in the exemplary plant. The cell processes are those conducted by the die casting machine, inter alia comprising (i) holding and dosing, (ii) spraying, (iii) casting, (iv) thermal control, (v) extraction, (vi) cooling water system, (vii) cooling, and (viii) trimming.

Figure 6:
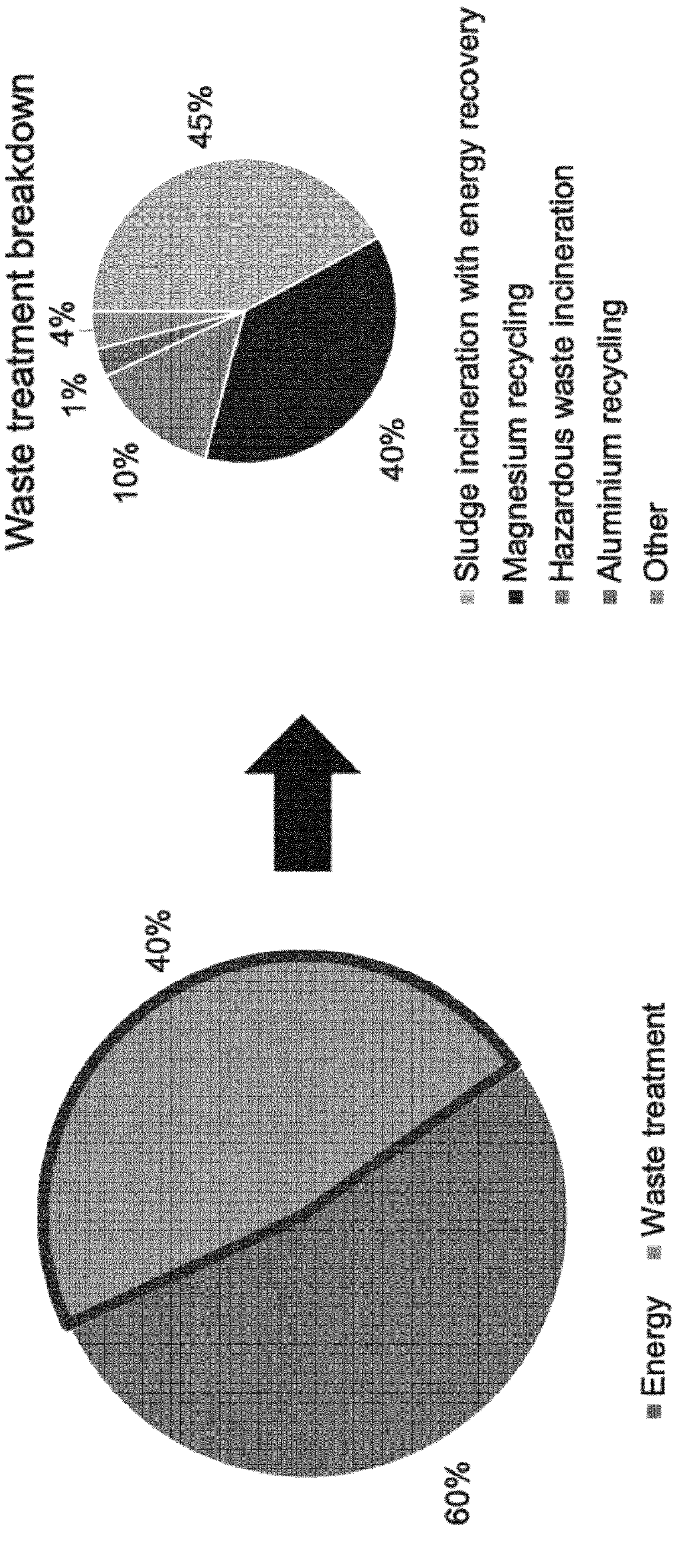

FIG. 6 shows a diagram illustrating schematically exemplary contributions to manufacturing emissions for the waste treatment.

Figure 7:
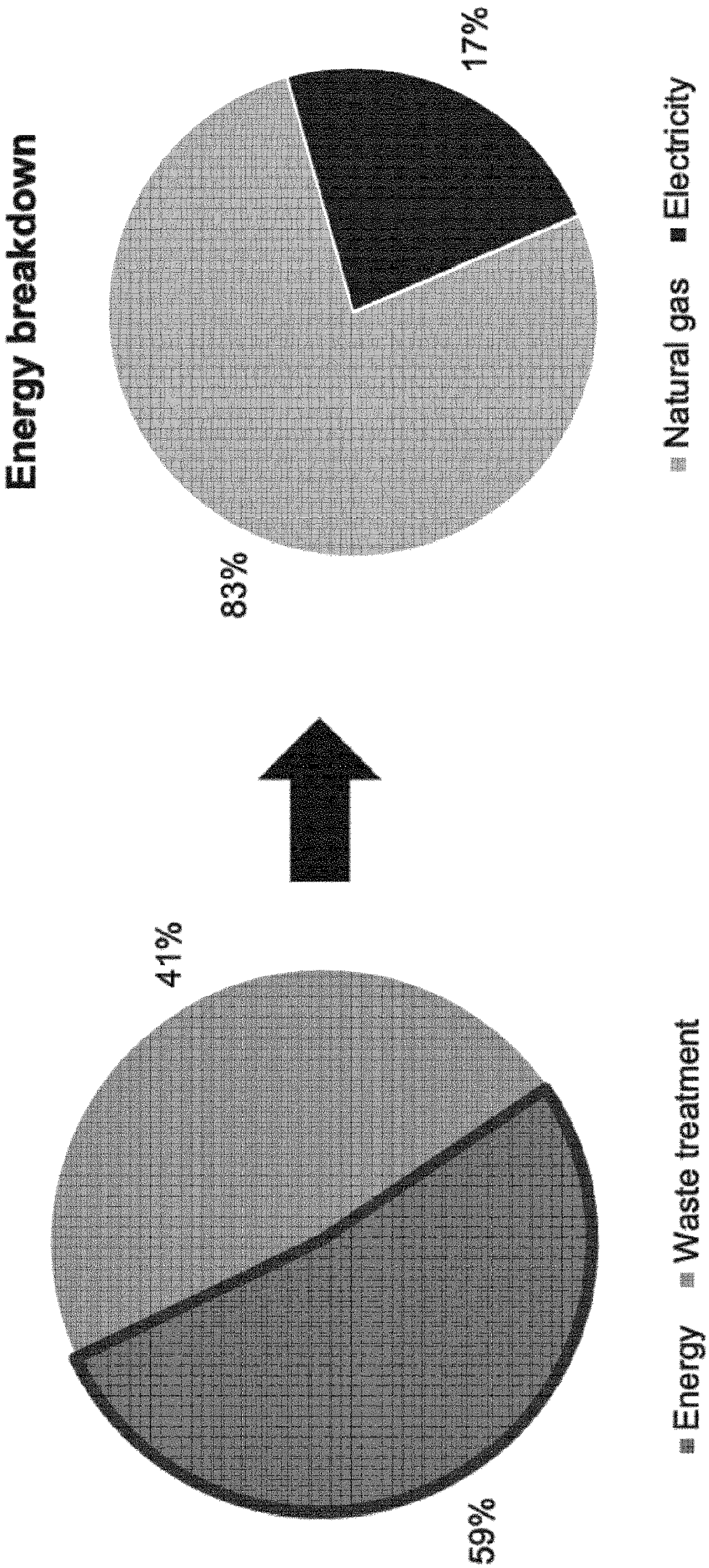

FIG. 7 shows a diagram illustrating schematically exemplary contributions to manufacturing emissions for the energy.

Figure 8:
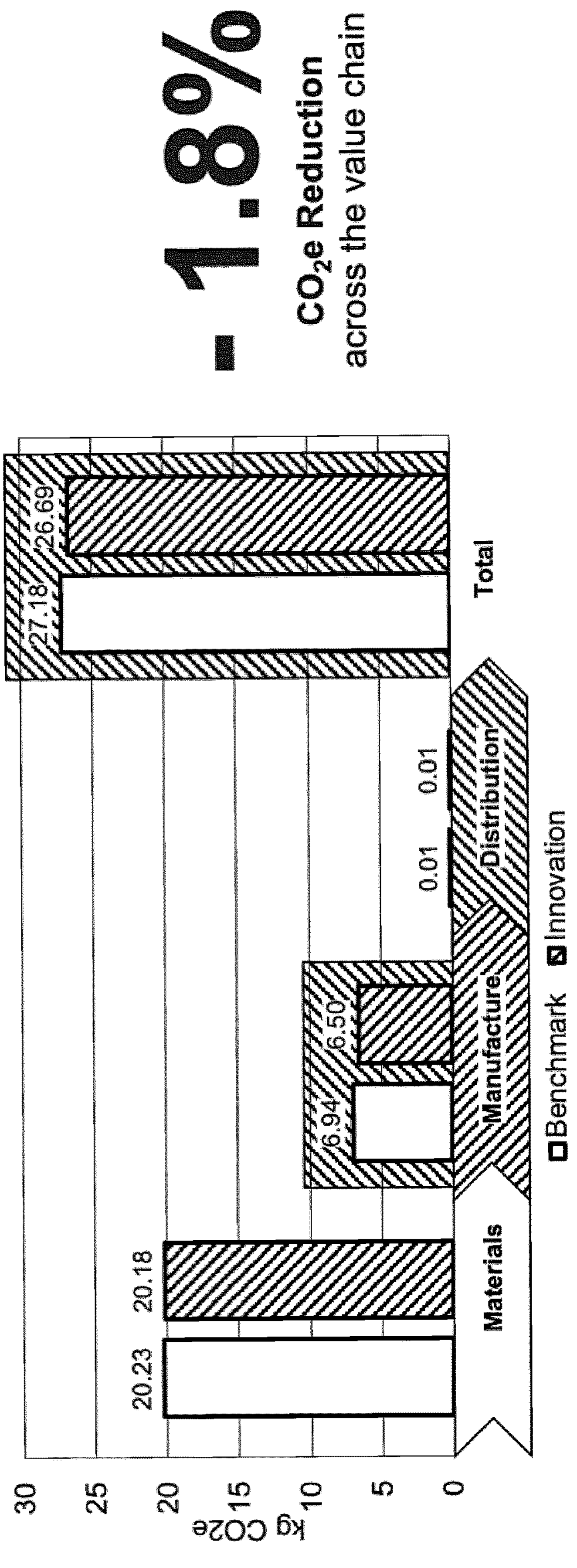

FIG. 8 shows a diagram illustrating schematically the measured and/or predicted savings in the exemplary customer value chain.

FIG. 9 shows a diagram illustrating schematically exemplary $CO_2$ distributions in narrow to broader scopes (scope 1-3).

Figure 10:
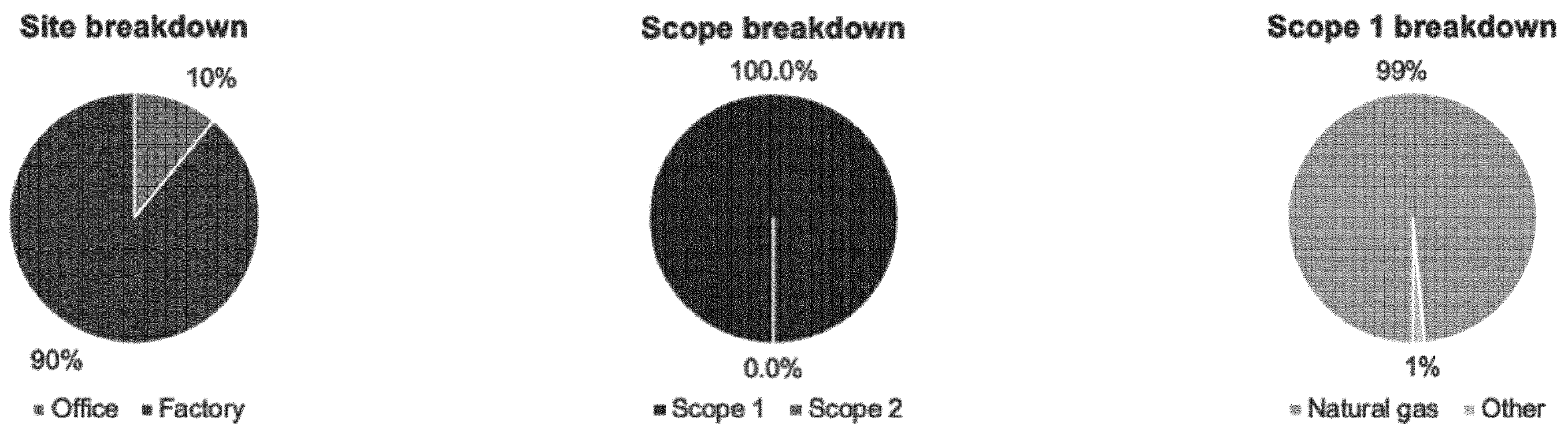

FIG. 10 shows a diagram illustrating schematically an exemplary breakdown of the site emissions. FIG. 10 is based on an exemplary site assessment in a die casting example by the inventive system 1.

Figure 11:
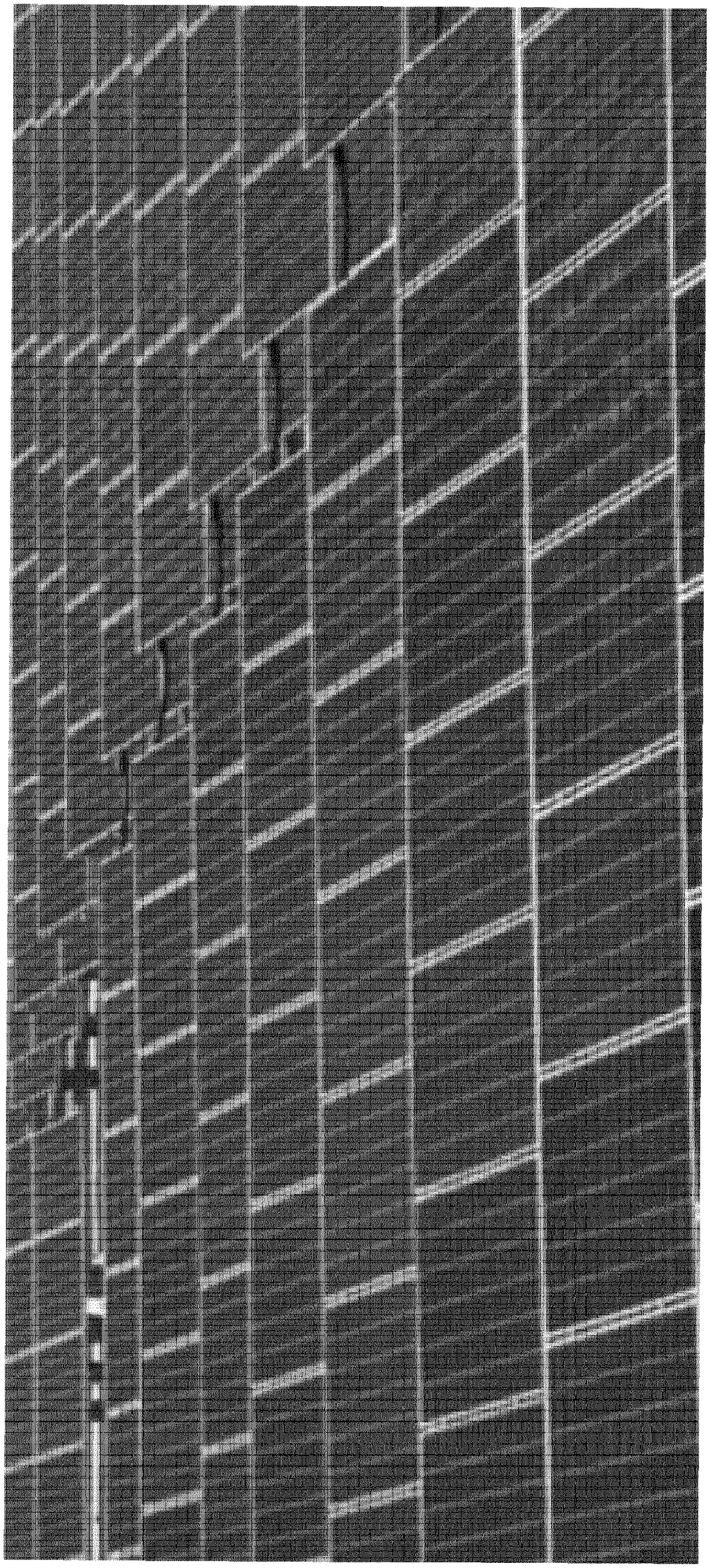

FIG. 11 shows a diagram illustrating schematically an exemplary dependence from the choice of sources of electricity for the $CO_2$ emission. Switching to green electricity (e.g. solar cells panels; see FIG. 11) can help further reduce emissions. For example photovoltaics can help to avoid emissions. This example in FIG. 11 uses electricity from carbon-free sources. This saves 2,500 tonnes $CO_2e$ per year. This amounts to a 5% reduction of total site emissions compared to if consuming electricity from the standard Swiss grid.

Figure 12:
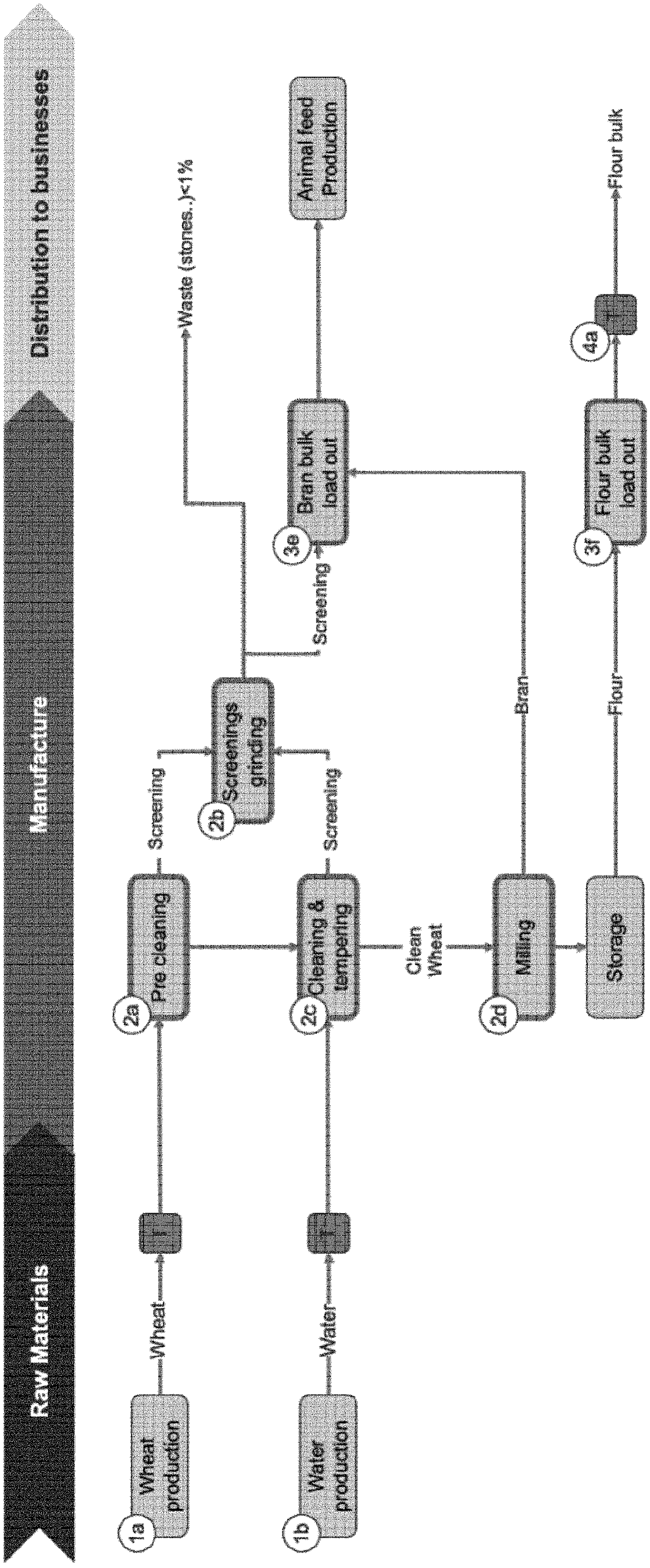

FIG. 12 shows a diagram illustrating schematically an exemplary process flow in flour production, wherein the blocks marked with "T" denote a transport and the other blocks processes. Reference numbers in circles denote calculation and monitoring references. Processes are given in blue squares while transport is given in yellow squares.

Figure 13:
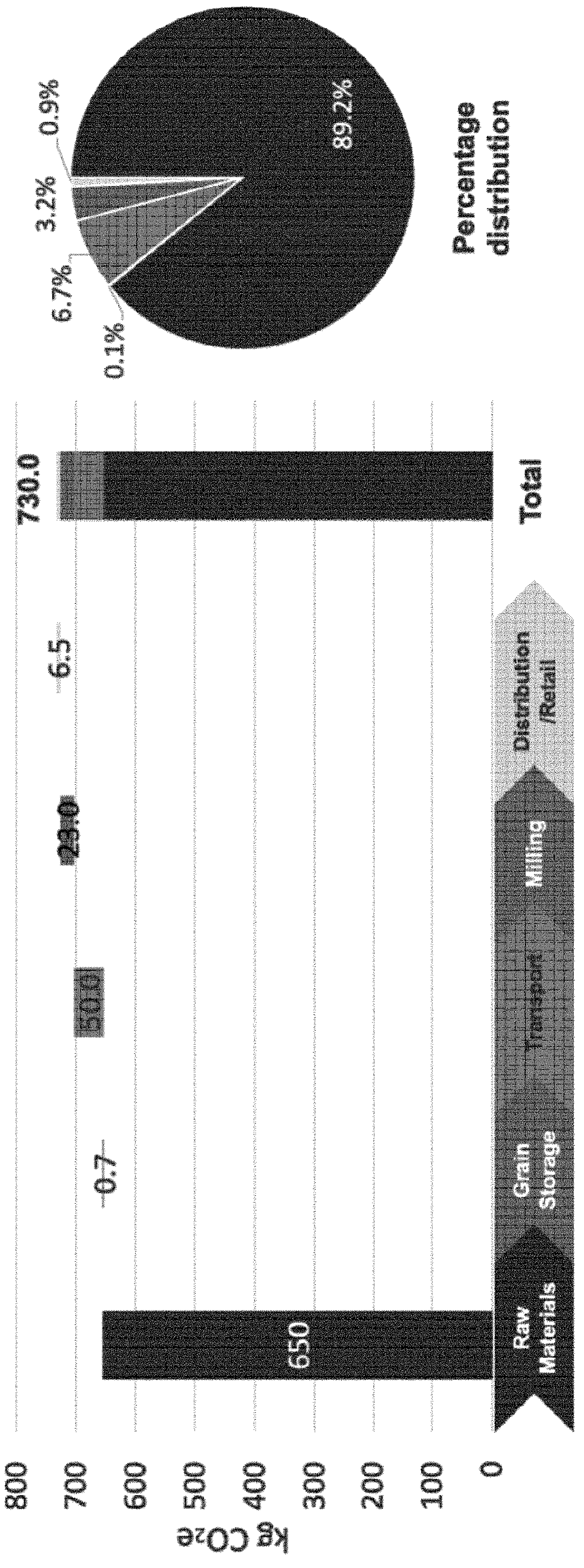

FIGS. 12 and 13 are based on an exemplary product assessment in a milling example by the inventive system 1.

FIG. 13 shows a diagram illustrating schematically an exemplary $CO_2e$ distribution for 1 tonne of flour with transport emissions in the milling example.

Figure 15:
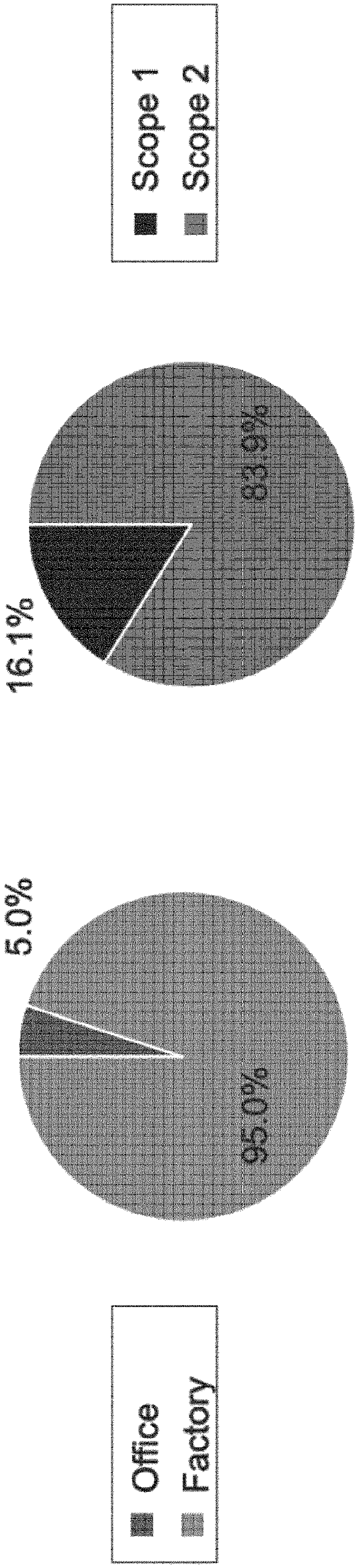
Figure 16:
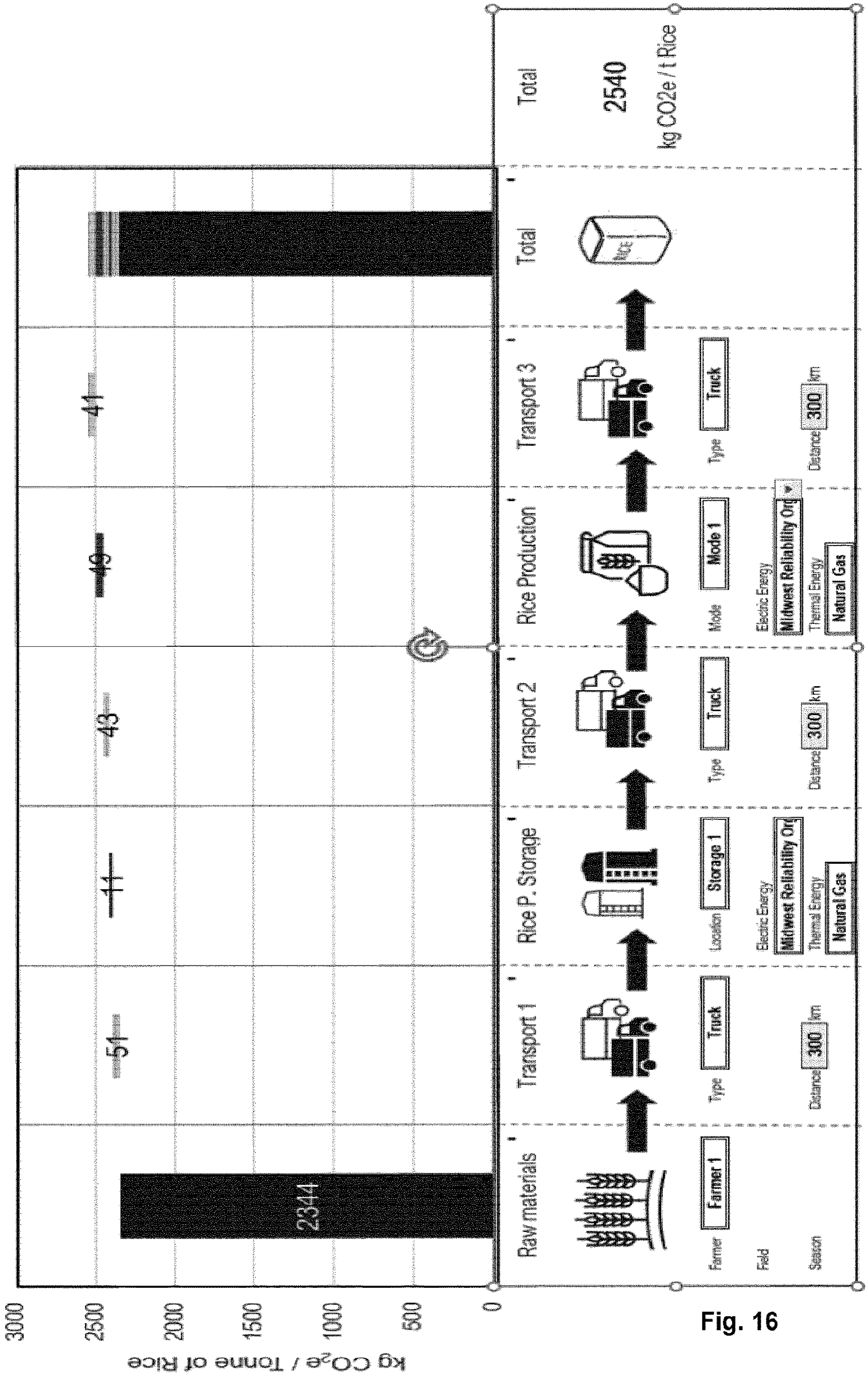

FIG. 14 shows a diagram illustrating schematically an exemplary implementation of defining and reporting of $CO_2$ emissions. FIGS. 14 to 16 are based on an exemplary site assessment in a milling example by the inventive system 1.

FIG. 15 shows a diagram illustrating schematically exemplary results for the exemplary site assessment with specific electricity emission factor.

FIG. 16 shows a diagram illustrating schematically an exemplary semi-dynamic modelling or simulation structure were different scenarios can be simulated, e.g. different raw material sources, transport routes, etc. In particular, it shows the dynamic assessment from the plant or farm to distribution.

Figure 17:
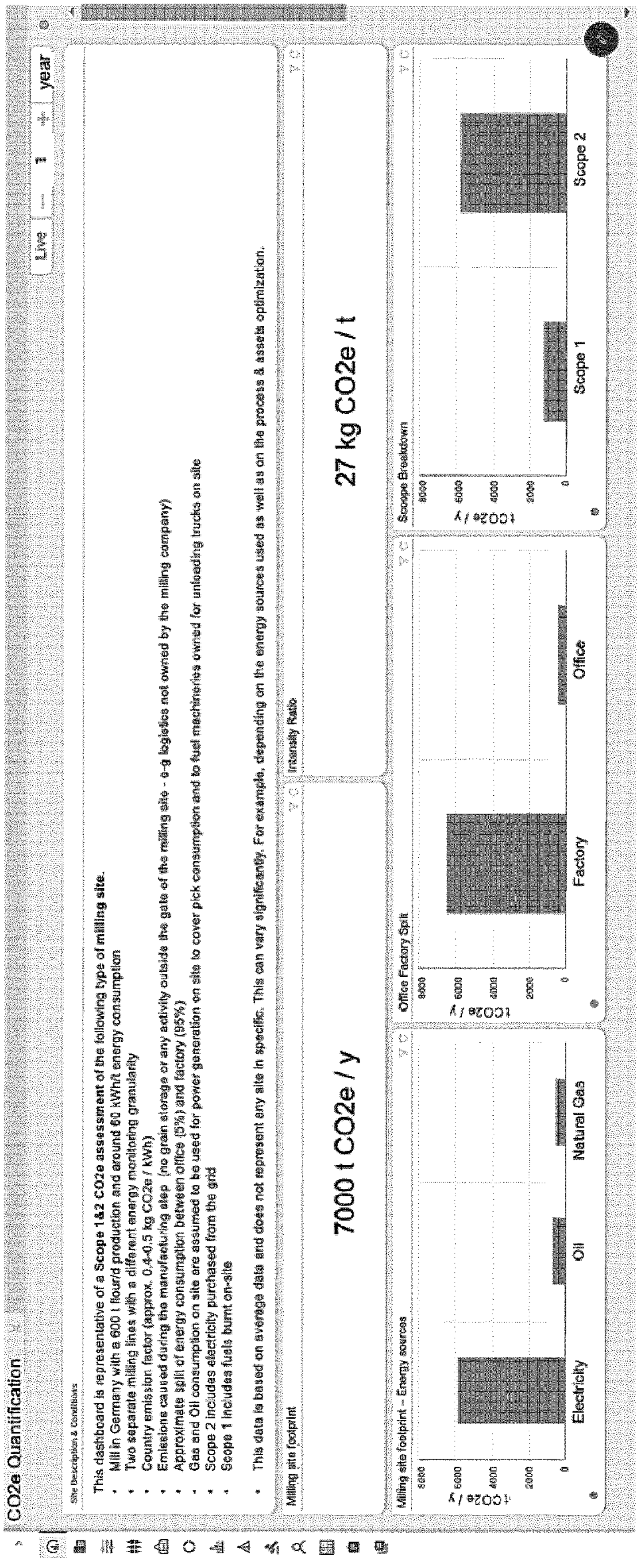
Figure 18:
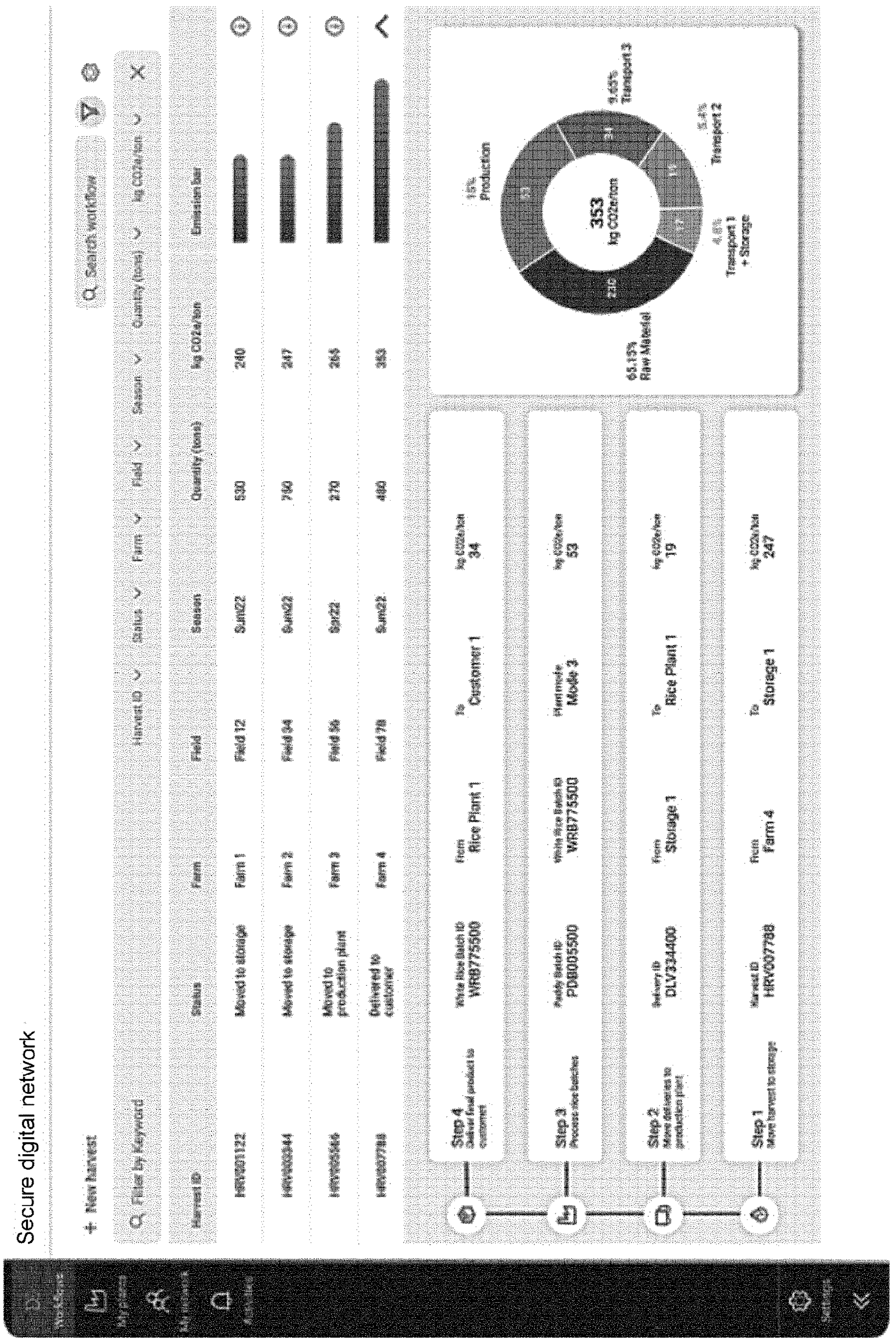
Figure 19:
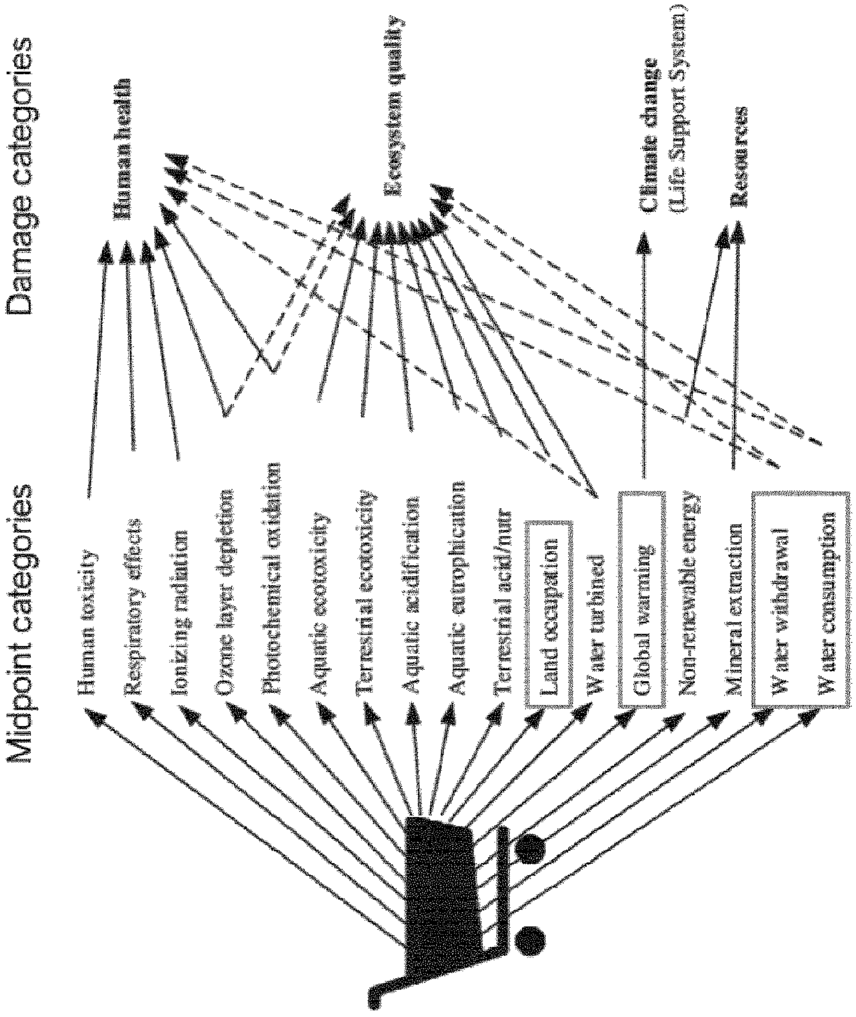

FIGS. 17 to 19 show a diagram/online dashboard illustrating schematically an exemplary $CO_2e$ quantification for the milling site example and for a rice customers final products respectively. The example in FIGS. 18 and 19 includes the date collected directly at farm/field level.

Figure 20:
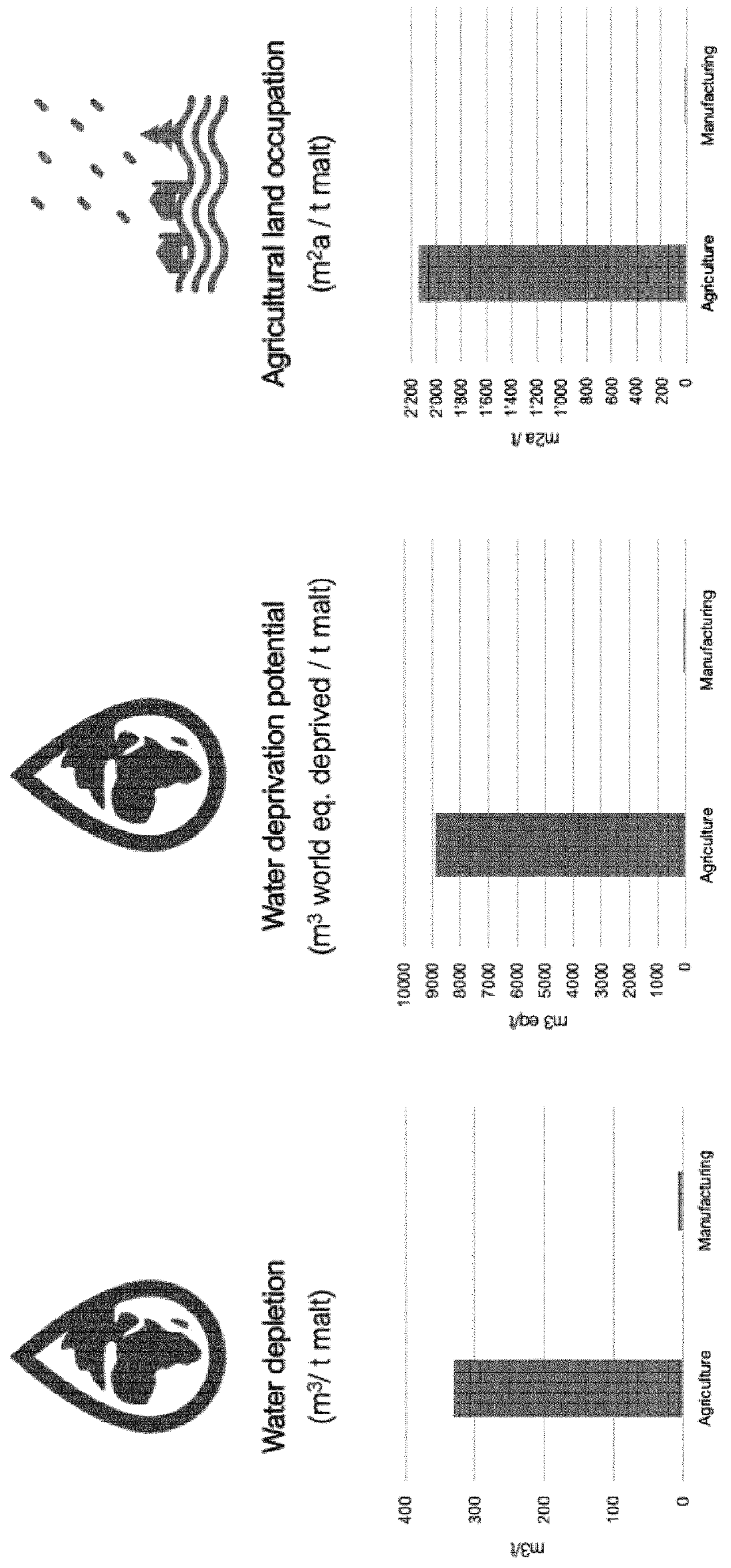

FIG. 20 shows how the impact on water depletion, water deprivation, and land use depending on the farming practices, crop and processing yield can be quantified for different scenarios. Thus, FIG. 20 illustrates the water and land use impact.

FIG. 21 shows an example of how with this solution a full sustainability journey can be established from measuring the status quo, reducing environmental impact, and only at the end looking at the ways to off-setting the remaining emissions. The tool allows a to accompany our customers through a comprehensive impact assessments, which include multiple environmental metrics, such as land use and water.

FIG. 22 show an example of a tailored reduction plan for a bakery customer. The impact of the action plan is directly quantified to show and be able to communicate the improvements. The tool and service provided will support customers to set an action plan and deliver the necessary solutions to achieve the targets.

Figure 23:
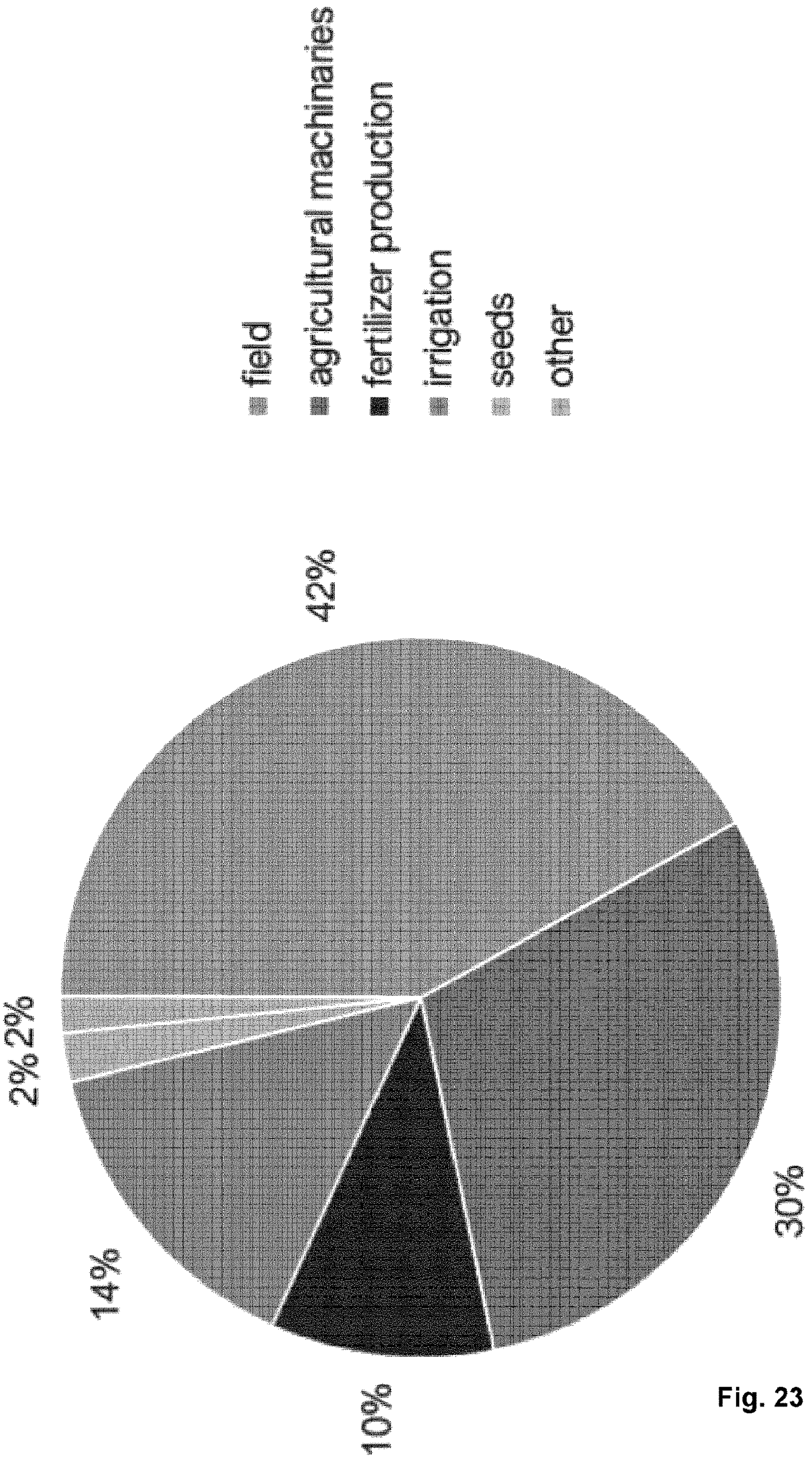

FIG. 23 shows an US example of a $CO_2e$ distribution of barley production (as a geo-footprint breakdown), with the barley emissions in $kg_{CO2e}/kg_{barley}$.

Figure 24:
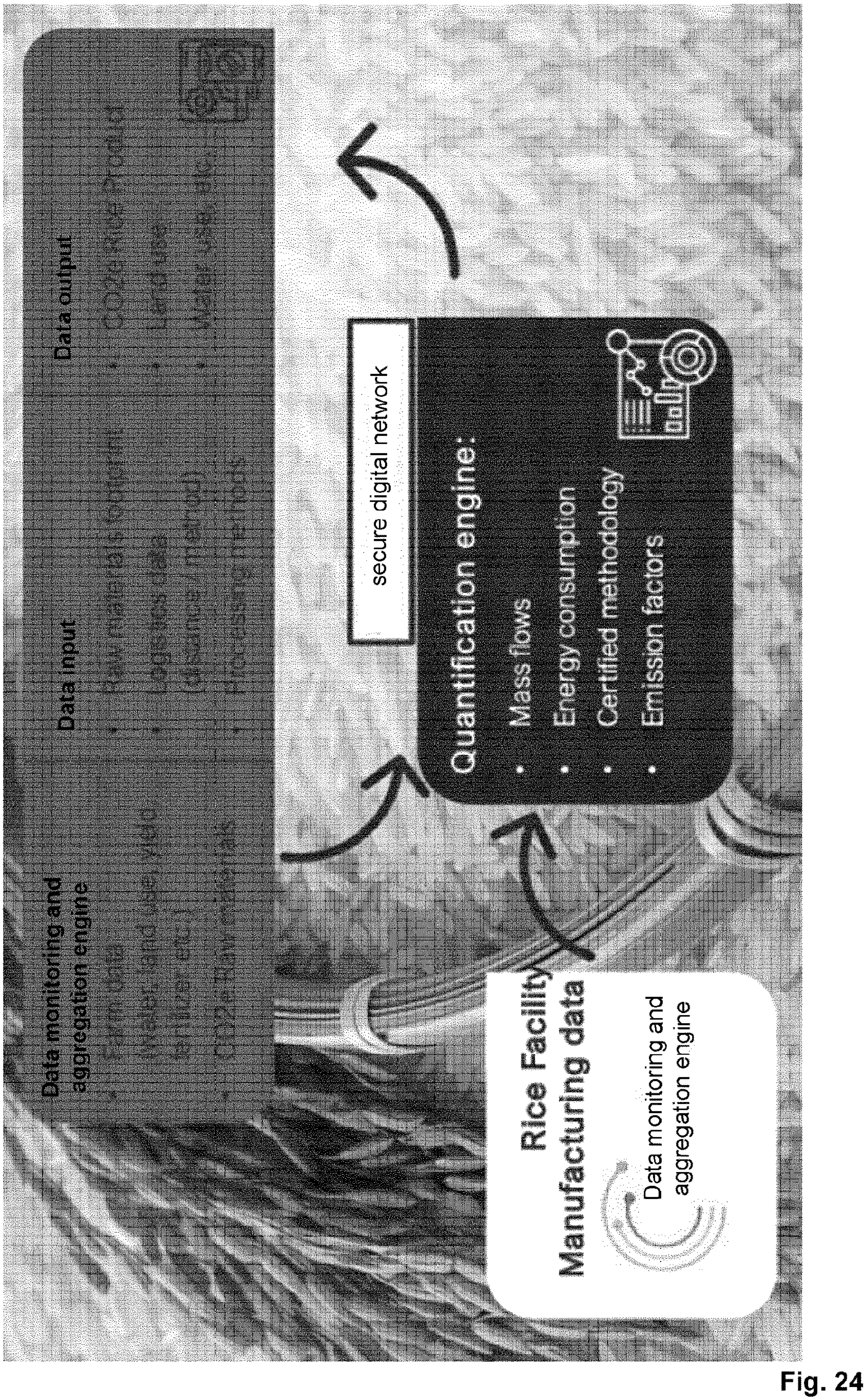

FIG. 24 shows exemplary that different features/impact parameters can be assessed and monitored by the device 10 to create different scenarios and final certifiable measurements and assessments. As an embodiment variant, this e.g. can be link to a tailored and dynamically generated action plan based on the measuring parameters to reduce the environmental impact with concrete actions. The example of FIG. 24 is related to rice, but it can be applied and adapted to any type of final product, food, or non-food. FIG. 24 illustrates exemplarily that, apart from the measuring parameter values of the measuring devices and sensors 13 of the device 10, the device 10 can e.g. receive additionally data from different sources to support the emission quantification steps for a given process. This can also be realized by connecting manual data inputs from the users, calculation model with databases for scientific values, and data from the cloud connected to specific processing/logistics steps within the value chain. Thus, the digital platform can provide an integrated B2B digital exchange platform or structure.

Figure 25:
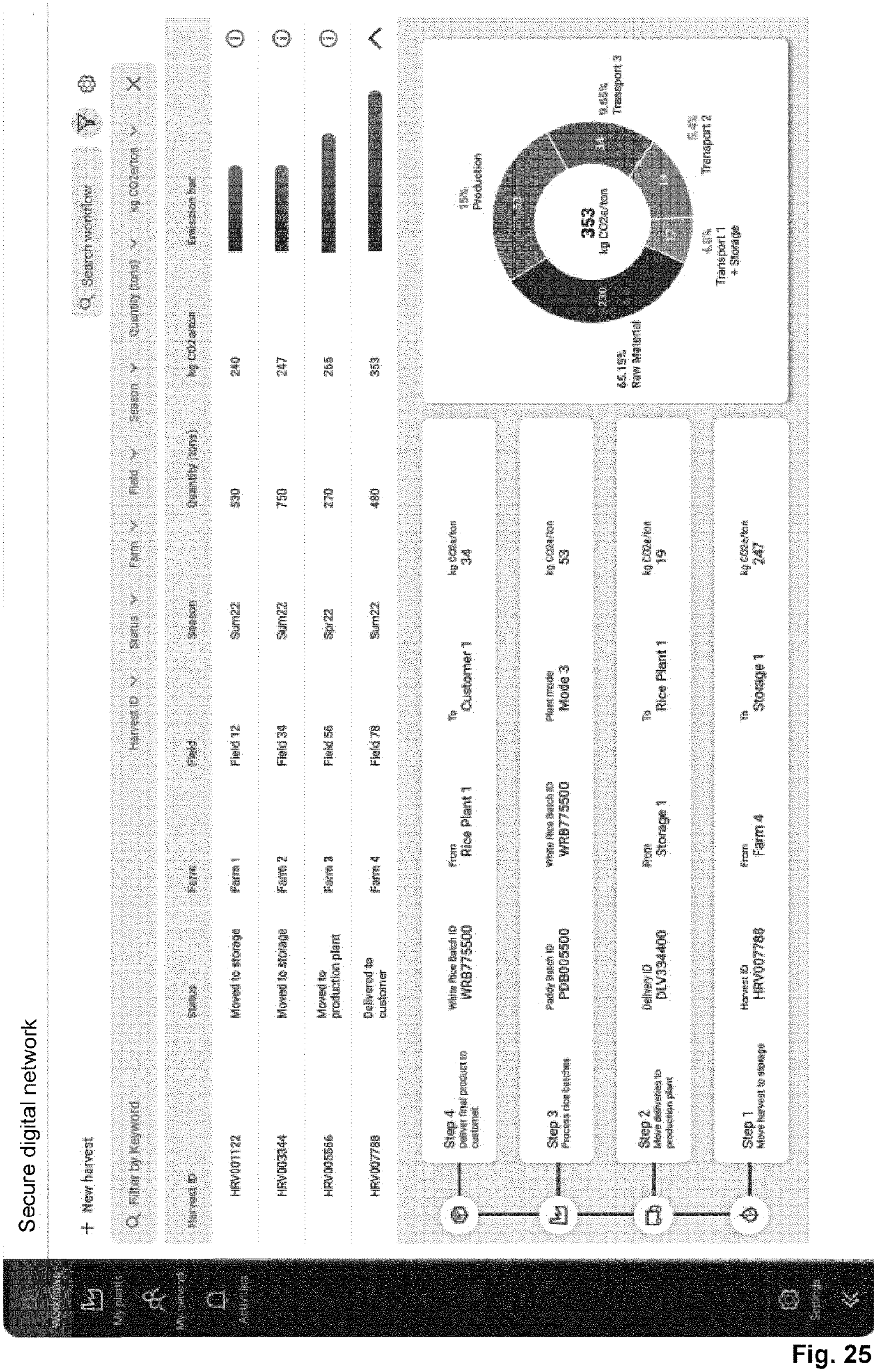

FIG. 25 illustrates exemplarily, how the parameters can be assessed against different parameters, such as land use, water, etc. The dynamic structure can e.g. have the capacity of the life cycle of the product from cradle-to-grave.

Figure 26:
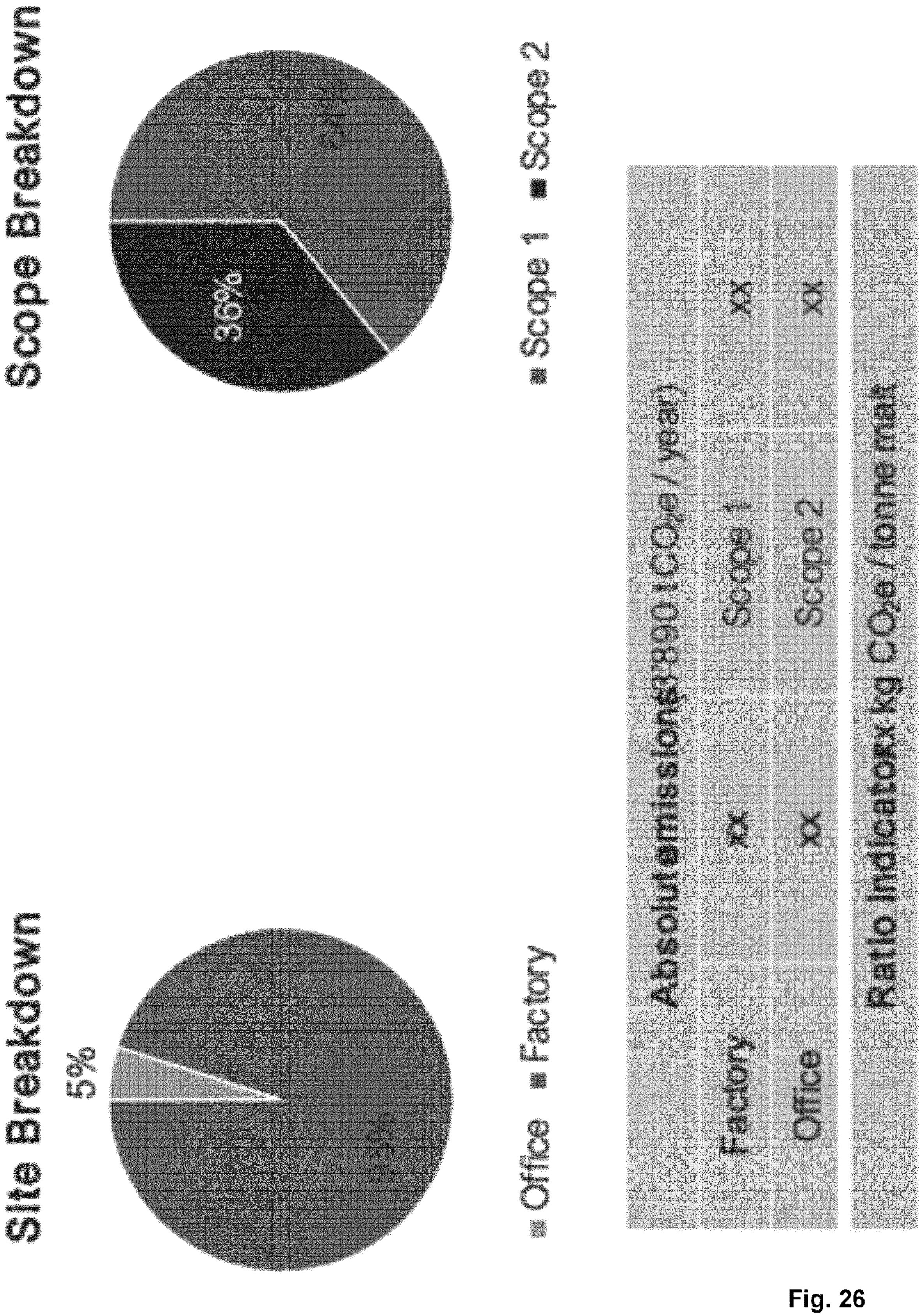

FIG. 26 illustrates exemplarily the direct emissions on the plant exemplary for rice. Thus, FIG. 26 shows an example site assessment with global emission factor.

Figure 27:
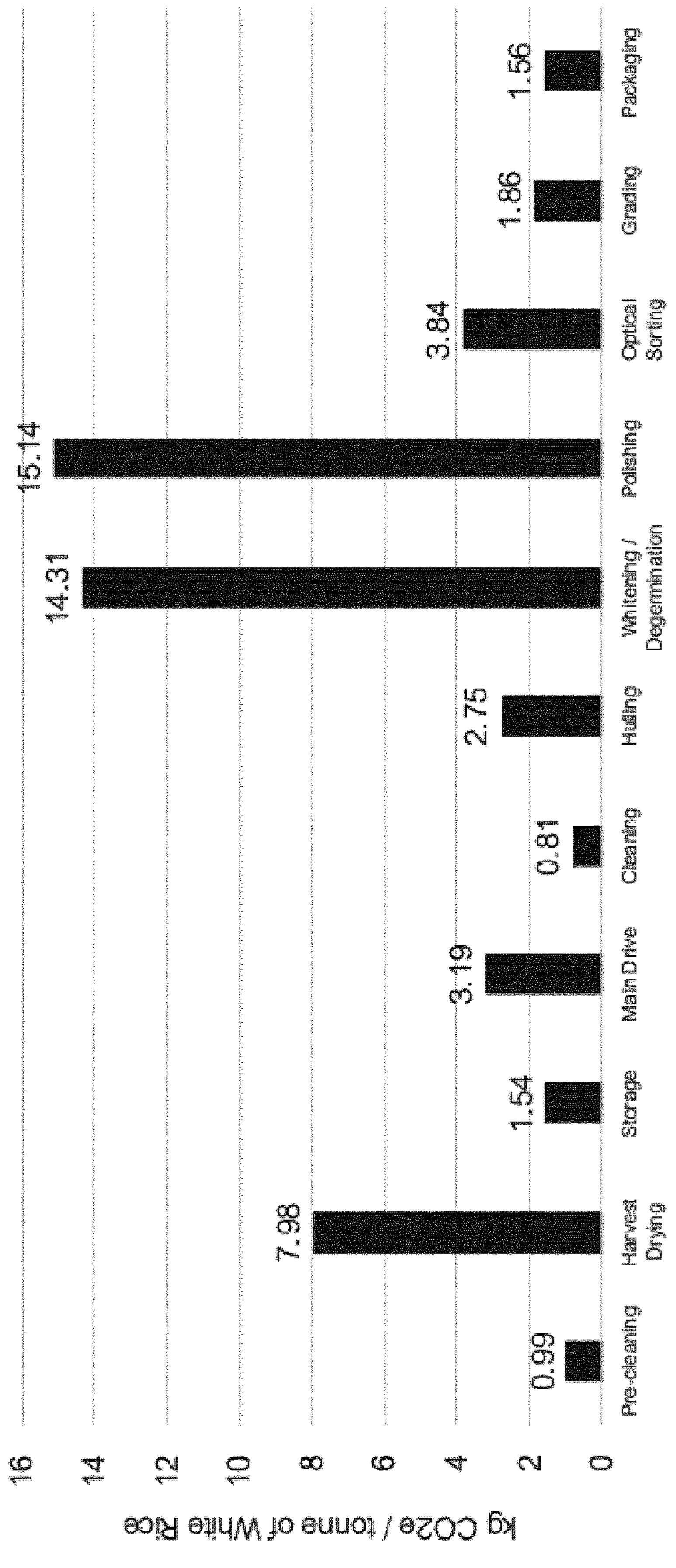

FIG. 27 shows an example of a $CO_2$ distribution of 1 ton of white rice, non-parboiled in manufacturing (cf. FIG. 26).

DETAILED DESCRIPTION OF THE PREFERRED EMBODIMENTS

Figure 1:
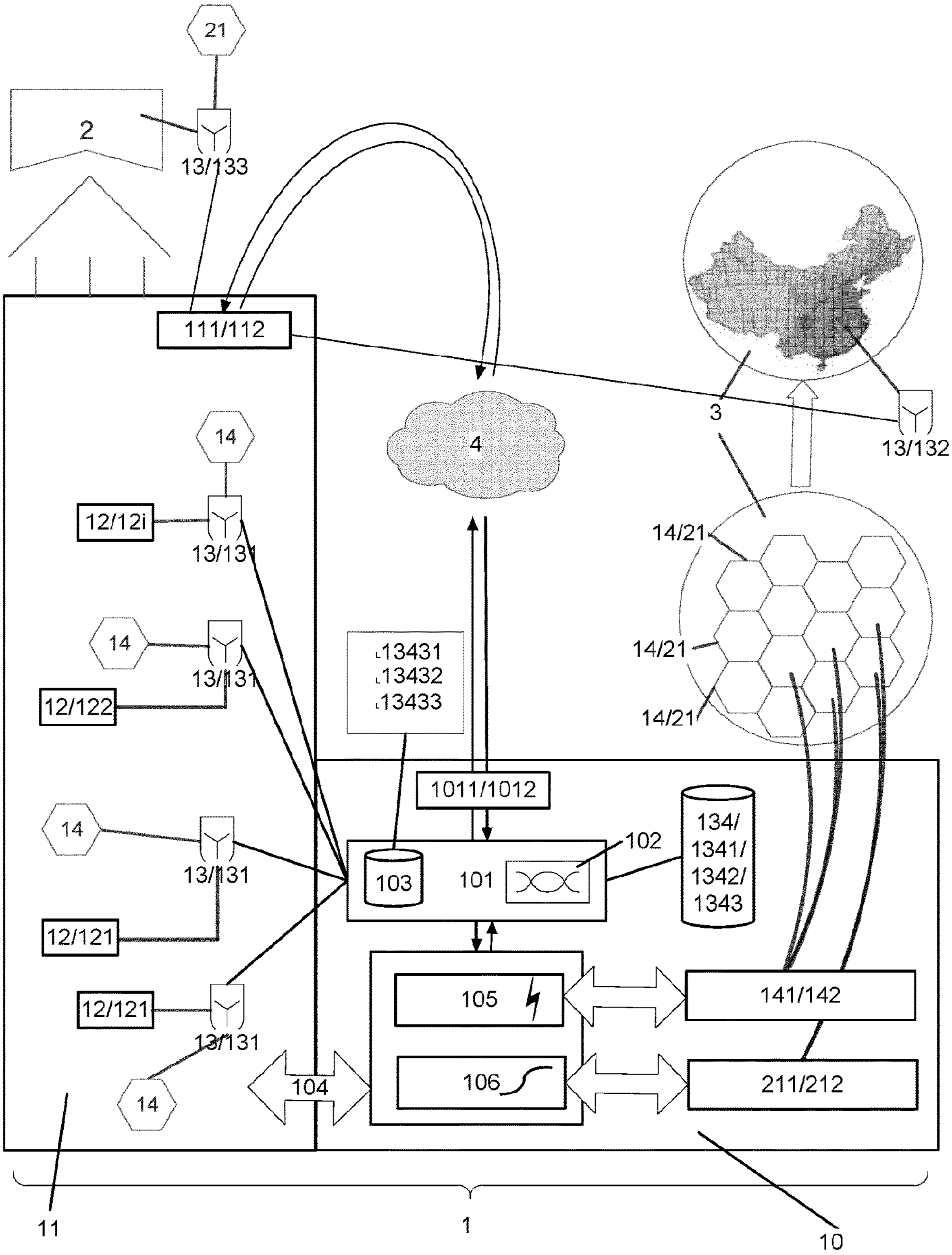
FIG. 1 shows a block diagram illustrating schematically an exemplary measuring and/or control device 10 for optimizing energy consumption control, steering and monitoring of an industrial site or plant 1 and measurement of an environmental footprint of an industrial site or plant 1 and/or of a product 2 manufactured or processed by said industrial site 1. The industrial site 1 comprises one or more processing units 12 for processing or manufacturing one or more products 2 and said control device 10 comprises an input section 101 comprising measuring devices and sensors 13 capturing measuring parameters at the processing units 12 and/or environmental measuring parameters associated with the industrial site 1, input/output interfaces 1011 and data transmission lines/networks 1012 to transfer the measured parameters to the control device 10.

FIG. 1 illustrates, schematically, an architecture for a possible implementation of an embodiment of the inventive method and system, in particular for the inventive measuring and control device 10 (also referred as dynamic environmental quantification measuring system 10) for optimizing energy consumption control, optimized steering and dynamic adaption and monitoring of an industrial site or plant 1 and measurement of an environmental footprint (as an embodiment variant also realizable as a quantified $CO_2$-footprint) of an industrial site or industrial plant 1 and/or of a product 2 manufactured or processed by said industrial site or plant 1. The environmental footprint provides measuring of not only the manufacturing or processing process measurands at a specific site or plant or farm 1, but can comprises measurands covering the complete environmental impact of a production chain of an industrial product 2, e.g. from the sowing, crop, raw material processing, transport, industrial processing, or manufacturing, up to the delivery transport, thus covering all aspects of the production of an industrial product 2 including transport and packing etc. In the latter embodiment variant of such a measurement, the term industrial site or plant 1 is used in a wider definition comprising all technical means for processing and providing an industrial product the mining or cultivation of raw material to the end product 2. However, the measurement of the environmental footprint can also be limited to a specific industrial plant 1, production line 11, or manufacturing process 113 providing only a partial step in the overall industrial production chain of the product 2. The industrial site 1 can e.g. comprise at least one industrial plant 1 and/or processing line 11 and/or production facility/equipment 12. The industrial site 1 comprises one or more processing units 12 for processing or manufacturing one or more products 2. The measuring and control device 10 comprises an input section 101 comprising measuring devices and sensors 13 capturing measuring parameters at the processing units 12 and/or environmental measuring parameters associated with the industrial site 1, input/output interfaces 1011 and data transmission lines/networks 1012 to transfer the measured parameters to the control device 10. The industrial site 1 can further also comprise one or more process lines 11 comprising at least one processing unit 12 for processing or manufacturing the products 2. It is important to note that the optimization of energy consumption of an industrial site 1 and the measurement of the environmental footprint of the respective industrial site 1 and/or of a product 2 manufactured or processed by the industrial site 1, can be decoupled technical aspects. For example, if there is mitigating procurement of green energy in the overall energy consumption, $CO_2$ reduction can become decoupled from energy reduction. Thus, for the expert system aspects of the present invention, the measured environmental footprint or $CO_2$-footprint and optimizing of the energy consumption by appropriate adaption and steering, in particular dynamic adaption of the operating parameters of process line 11 or industrial plant 1, do not need to have a direct relationship.

The dynamic environmental quantification system and control device 10 can be built based on the environmental quantification assessment (in line with the GHG (Green-House Gas) protocol). It takes all the activities inputs (e.g. kwh/t, fertilizers t/t of raw material) and factors them for the specific emission factor (e.g. t $CO_2$e/t wheat).

The dynamic monitoring and steering/control device 10 allows different entries for each activity. Therefore, it can compare the environmental impact of the different options (e.g., different agricultural activities, energy sources, transport routes, etc.). The dynamic device 10 can comprise a secured digital network, where the network is based on a blockchain-based structure that allows users to share data in an immutable and secure way within a digital network. The digital network provides the means for the participants to share data in real-time regarding the carbon footprints for the stages of a given process. Apart from the measuring parameter values of the measuring devices and sensors 13 of the device 10, the device 10 can e.g. receive additionally data from different sources to support the emission quantification steps for a given process. This can also be realized by connecting manual data inputs from the users, calculation model with databases for scientific values, and data from the cloud connected to specific processing/logistics steps within the value chain. Thus, the digital platform can provide an integrated B2B digital exchange platform or structure.

Different features/impact parameters can be assessed and monitored by the device 10 to create different scenarios and final certifiable measurements and assessments. As an embodiment variant, this e.g. can be link to a tailored and dynamically generated action plan based on the measuring parameters to reduce the environmental impact with concrete actions. FIG. 24 illustrates an example for rice, but it can be applied and adapted to any type of final product, food, or non-food.

In a further embodiment variant, the setting of the parameters can be realized dynamically. Table 1 below shows an example of parameters, which can be dynamically adapted and steered by the measuring and control device 10.

| | Raw Material | Transport | Pre-Cleaning to Storage | Rice Manufacturing |
|---|---|---|---|---|
| Proposed Dynamic Parameters | Farmer<br>Field<br>Season<br>Corp | Method (Truck, train, ship etc.)<br>Combination of multiple methods possible<br>Distance | Location<br>Electric Energy Type (Average, green etc.)<br>Thermal Energy Type (Gas, LNG, Biogas etc.)<br>Intermediate Packaging: Material<br>Weight<br>Reusability | Location<br>Throughput<br>Storage Time<br>Electric Energy Type (Average, green etc.)<br>Thermal Energy Type (Gas, LNG, Biogas etc.)<br>Packaging<br>Size<br>Material<br>Weight<br>Reusability |

(Table 1 shows an example of dynamic setting of operational parameters by the device 10)

These parameters can be assessed against different parameters, such as land use, water, etc. The dynamic structure can e.g. have the capacity of the life cycle of the product from cradle-to-grave, as shown in FIG. 25. FIG. 26 illustrates the direct emissions on the plant exemplary for rice. Thus, FIG. 26 shows an example site assessment with global emission factor. FIG. 27 shows an example of a $CO_2$ distribution of 1 ton of white rice, non-parboiled in manufacturing.

The control device 10 can e.g. comprise at least one programmable logic controller (PLC) or programmable controller associated with the industrial site as automation controllers adapted for the control of a manufacturing process or product processing process at the industrial site, the PLC input and output devices (I/O) realized as in-house integral with a data processor or rack-mounted as modular devices with I/O devices. The PLCs of the industrial site can e.g. be connected over a data transmission network 4 to a supervisory control and data acquisition (SCADA) system of the control device providing programming and process fault diagnosis of processing units of the industrial site.

The input section 101 captures and/or monitors and/or records predefined measuring parameters 134 triggering in the data-pathways of the measuring devices and sensors 13 for the generation of value settings for optimizing the control and steering of the energy management of the industrial site 1.

The monitored measuring parameters 134 comprise parameter vectors wherein the parameter values of the parameter vectors are time series of parameter values changeable over an entire predetermined operation period, and/or parameter scalars, wherein the parameter values of the parameter scalars do not change throughout the entire operation period, and constructional parameters, wherein the constructional parameter values represent structural characteristics of the industrial site 1.

Based on the monitored measuring parameters 134, a product environmental quantification measure value 21 is generated measuring an environmental intensity 22 (e.g. in $CO_2$e) of a product 2 processed or manufactured by the industrial site 1 and/or an industrial site environmental quantification measure value 141 (e.g. in $CO_2$e) is generated measuring a quantified environmental footprint 14 of the industrial site or plant 1. The $CO_2$e quantification measure value 21 can e.g. be generated by the control device 10 or by a dedicated $CO_2$e quantification module 107 of the control device 10. The term "module," as used herein, refers to logic embodied in hardware or firmware, or to a collection of software instructions, written in a programming language and implemented on hardware (or realized as hardware) to steer and operate the respective hardware components as e.g. processors. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable storage medium or other storage device. Some non-limiting examples of non-transi-tory computer-readable storage medium include CDs, DVDs, flash memory, and hard disk drives. Based on the generated product environmental impact quantification measure value 211 (e.g. given in $CO_2e$) and/or the generated industrial site environmental impact quantification measure value 141 (e.g. given in $CO_2e$), the control device 10 can e.g. provide optimized improvement measures by mutual weighing impact of varying cost parameters and possible improvement measures. The control device 10 can e.g. provide a dynamically adapted line configuration based on the optimized improvement measures.

Figure 2:
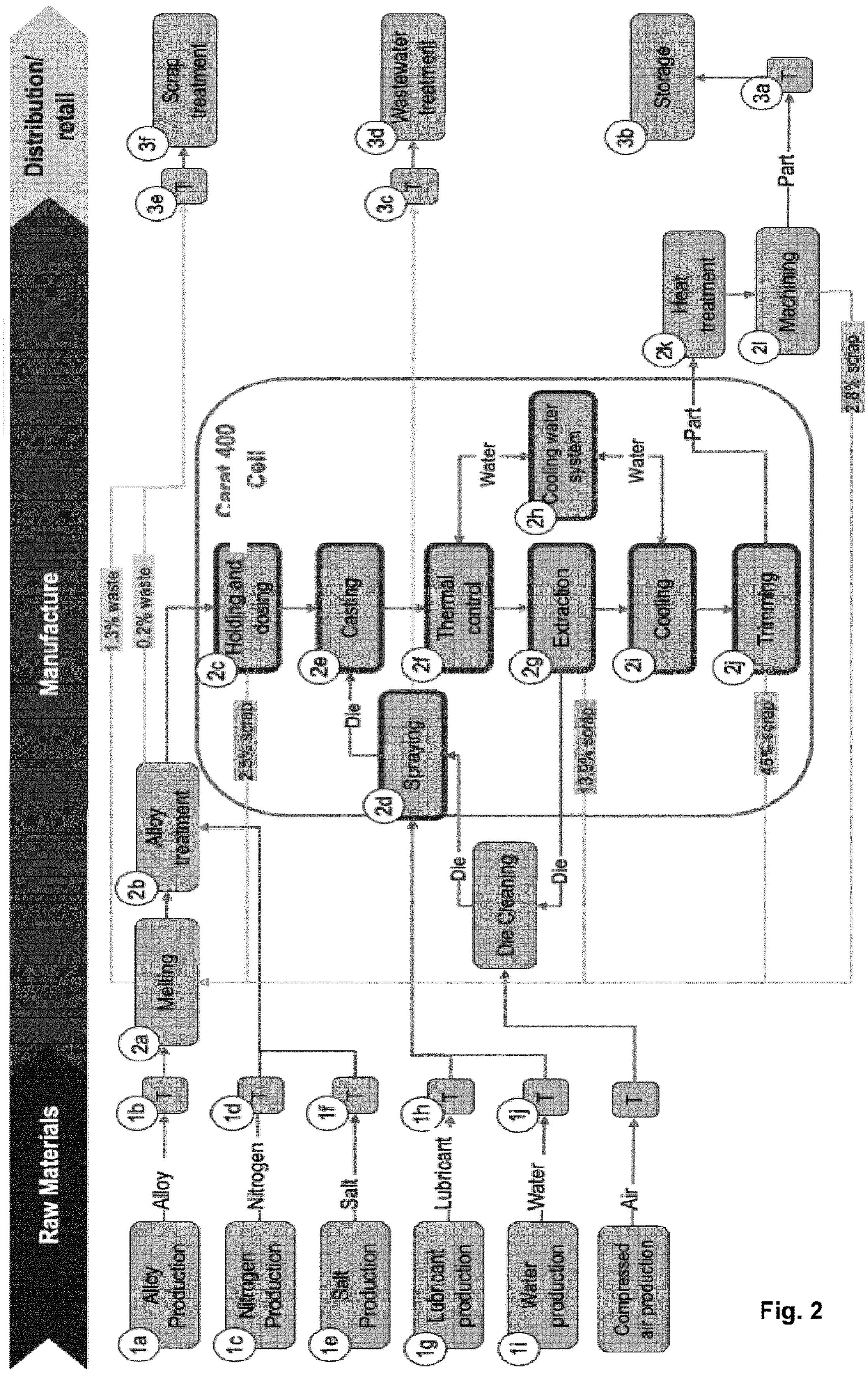
FIG. 2 shows a block diagram illustrating schematically an exemplary PFD of aluminum die casting, wherein the blocks marked with "T" denote a transport and the other blocks processes. Reference numbers in circles denote calculation and monitoring references. Processes are given in blue squares while transport is given in yellow squares. Bold encircled squares denote processes within the cell, i.e. the die casting machine. Table 1 below shows an exemplary listing and classification of raw materials, produced waste products and used energy producing relevant emission factors by life cycle stage of the die casting process.

The control device 10 can further comprise a carbon footprint inventory system 108. The carbon footprint inventory system 108 can further includes an interface 1081 and/or data capturing module 1082, a setting module 1083, a selecting module 1084, a material detector 1085, a notification module 1086, a data processing module 1087, a displaying module 1088, and a verifying module 1089. The modules 1081-1089 may comprise computerized instructions in the form of one or more program codes that are stored in the storage device and executed by the at least one processor. In one embodiment, the storage device may be an internal storage system, such as a random-access memory (RAM) for temporary storage of information, and/or a read only memory (ROM) for permanent storage of information. In some embodiments, the storage device may also be an external storage system, such as an external hard disk, a storage card, or a data storage medium. The interface receives an inventory procedure of the product or industrial plant/site e.g. selected via a graphical user interface (GUI), and executes an inventory process of the product or industrial plant/site. The inventory procedure can e.g. include a first inventory, a reference template inventory, and/or a historical reference inventory of the product or industrial plant/site. When a user selects the first inventory (e.g., by selecting the first inventory displayed on a display screen using a mouse, keyboard, and/or a touchscreen), the first setting module can e.g. set standard units and parameters of the inventory processes, and receives the standard units, such as a quality unit and a volume unit, for example, and the parameters, such as life cycle assessment (LCA) parameters and GWP parameters, for example, which are input in the inventory procedures. When the user selects the reference template inventory, the interface receives a template selected by the user. Different industries may apply different templates. The interface loads the standard units and the parameters of the reference template inventory e.g. from the storage device to offer the user various reference selections in the inventory processes. When the user selects the historical reference inventory, the interface receives a historical reference inventory and inventory structure selected by the user. The interface copies the standard units and the parameters of the historical reference inventory and inventory structure providing the same reference selections for approval by the user and/or as predefined or start setting. The first setting module sets inventory targets of the carbon footprint inventory of the product. The inventory targets can e.g. comprise an inventory project, certain inventory criteria, an organization of the product or industrial plant/site, an inventory period. For example, in FIG. 2, the inventory project is “alloy production”, one of the inventory criteria is denoted by the reference “Carat 400 Cell”, i.e. the die casting machine, and given by its structure, and the inventory target may e.g. be (i) measuring the $CO_2e$-footprint of the alloy or the production site or the overall production process, (ii) optimization of the $CO_2e$ footprint, or (iii) optimizing of the energy consumption of the production process of the alloy. Finally, for example, the organization may be a steel company. A specific product of a production site can e.g. be selected by means of the selecting module according to the inventory targets, and loads material data of the product. For example, the selecting module can e.g. select a particular alloy as the product e.g. according to a demand of the user. The selecting module loads the material data of the product from a dedicated database. The material data may include a list of materials in the product, and, in relation to each material, e.g. a vendor and/or material characteristics as weight/composition/properties etc., for example. All the materials of the product can e.g. be displayed by the selecting module displays on a display device according to a tree diagram or another suitable graphical representation. The selecting module may further load an image of the product for a reference. The material detector 1085 electronically detects and/or determines materials of the product e.g. according to the weight of each material and a $CO_2e$ analysis based on the $CO_2e$ properties of each material. The product 2 can comprise a plurality of different materials 214, and the weight and/or weight properties (as e.g. its molecular weight) of each material 2141-214*i* may be different. The material detector 1085 can determine a weight proportion 214*i*2 which is a proportion 214*i*2 of the weight 214*i*1 of each material 214*i*1 to the total weight of the product 2 according to the weight analysis of each material 2141-214*i*. The material detector 1085 picks the materials 2141-214*i* with greater weight proportions to avoid wasting time on materials 2141-214*i* with less, or insignificant, weight proportions. The material detector 1085 can e.g. perform the same steps for the production cycle in situ etc. The material detector 1085 can measure and/or determine a $CO_2e$ proportion 214*i*3 which is a proportion 214*i*3 of the $CO_2e$ exhausted from each material 2141-214*i* to the total $CO_2e$ exhausted from the product 2 in the life cycle according to the $CO_2e$ analysis of each material 2141-214*i* and the production process. Finally, the notifying module 1086 may generate an appropriate notice to a vendor of a material participating in the carbon footprint inventory, if the required data are not available, and requests the vendor to inventory the $CO_2e$ data of the material 214. Regarding the used materials 2141-214*i* in the production process, the materials 2141-214*i* may include more or less relevant materials 2141-214*i*, where a more relevant material 2141-214*i* is a material 2141-214*i* whose $CO_2e$ proportion reaches a larger proportion, one percent, for example, than a less relevant material 2141-214*i*. The $CO_2e$ proportion 214*i*3 is a proportion 214*i*3 of the $CO_2e$ exhausted from each material 2141-214*i* in relation to the total $CO_2e$ exhausted from the product 2 in the life cycle. The priority of more relevant materials 2141-214*i* is higher than the priority of less relevant materials 2141-214*i*. Thus, in the material 214, the priority of a material 2141-214*i* with greater $CO_2e$ proportion 214*i*3 is higher than the priority of a material 2141-214*i* with less $CO_2e$ proportion 214*i*3.

The control device 10 generates the $CO_2e$ of a product or an industrial plant/site 1 according to the condition and characteristics parameters of the setting of the process line 11 and/or processing units 12 of the carbon footprint inventory and/or the priority of the used materials. The control device 10 generates any uncertainties or imponderables of the $CO_2e$ of the product or industrial plant/site according to a generation structure generating such uncertainties or imponderables. This structure can e.g. comprise machine-learning-based or artificial-intelligence based units being trained based on historical data e.g. of optimized running processing units 12. The generation structure for generating the carbon footprint can e.g. multiplying activity level data in the life cycle of a product or industrial plant/site by an exhausting factor to obtain the $CO_2e$ in the life cycle of a product 2 or industrial plant/site 1, or multiplying activity level data in some stages of the life cycle of the product 2 or industrial plant/site 1 by an exhausting factor to obtain the $CO_2e$ in some stages of the life cycle of the product or industrial plant/site. The activity level data includes material activity level data, power activity level data, and waste activity level data. The units of the activity level data may be a kilogram, a cubic meter, a kilowatt, a kilometer, for example. The exhausting factor is the $CO_2e$ of the activity level data in each unit. For example for a specific product, if all of the material or processing unit 12 activity level data, the power activity level data, and the waste activity level data is fifteen cubic meters and the $CO_2e$ in each cubic meter is zero-point one kilogram, then the $CO_2e$ of the product 2 in life cycle is one point five kilogram, the result of multiplying fifteen by zero point one. Generating uncertainties in relation to the $CO_2e$ of the product 2 or industrial plant/site 1 is to take account of any uncertainties in a result of a $CO_2e$ value generation and minimize the effects of such uncertainties, to raise confidence in the result of the $CO_2e$ value generation. To generate such uncertainties, e.g. the Monte Carlo simulation can be used. Finally, the displaying module can e.g. generate an inventory report including the $CO_2e$ of the product or industrial plant/site and any uncertainties. The displaying module can e.g. combine the inventory report with a process chart of each stage in life cycle of the product or industrial plant/site or process line 11 and/or processing unit 12, and displays the inventory report and the process chart on the display device. The process chart can e.g. comprise the $C0_2e$ measuring values and any uncertainties corresponding to each stage in the life cycle of the product or industrial plant/site. The system can be realized to allow to generate $C0_2e$ outputs of each stage in the life cycle of the product or industrial plant/site. It is to be noted that $CO_2e$ emissions and/or energy consumption is used herein in the example, although the output parameters of the control device 10 may convey other information. Although most emissions can be converted into a $CO_2e$ emission by applying accepted factors, virtually every resource usage by an organization or industry can also be converted into a $CO_2e$ emission by applying suitable factors, since every resource can be associated with an amount of energy used to create the resource, consume the resource, and dispose of any resource waste. For example, airline travel by employees or the usage of paper can be converted to a $CO_2e$ emission.

The organization can e.g. enter target levels to the control device 10, such as $CO_2e$ levels, for future emissions for a defined time period, as e.g. years. The target levels will typically be a line that may increase, decrease, or stay the same over time. Typically, the organization's targets for future emissions will be lower than extrapolated predicted future emissions (baseline emissions) determined by the control device 10, where the baseline emissions are predicted future emissions assuming no strategies are implemented to reduce emissions. For example, the control device 10 can e.g. measure that the organization's future emissions will increase by 10% per year due to the anticipated growth of the organization.

The control device 10 can the create a graphical representation as a chart indicating the past, current, and predicted baseline emissions for the defined period of time, as e.g. span of years, along with the target line. The baseline emissions and target line will normally diverge to form a wedge-shaped gap. The organization must then devise ways to close the gap using one or more strategies. These strategies may include, for example, progressively adapting or renewing or optimizing process units 12, using other energy resources, using other materials in the production process, changing transportation means or ways or structures, reducing employee travel, replacing bulbs with LEDs, using more efficient windows, using green power sources, etc. Each strategy can be associated with a different implementation time. The strategies may be generated as expert devices by means of the control device 10 acting as an expert system. Again, the control device 10 is able to provide information for each unit of an industrial site/plant 1 relevant to environmental impact. Some of the information may be related to resource consumption of the industrial site 1, such as types of energy used (e.g., electricity, natural gas, diesel, oil, coal, etc.), quantities of energy used (e.g., kwh, gallons, etc.), dates of energy used, costs of energy used, airline travel, lighting usage, types/amounts of products manufactured and types/amounts of emissions, effi-ciencies, waste products, water usage, raw input product usage (e.g., paper, metals, etc.), costs of various pertinent resources, and other types of data pertinent to resource consumption. The control device 10 can save the individual resource consumption entries as resource consumption items for the industrial site 10 in the carbon footprint inventory system 108. Some of the information may also be related to demographics of the organizational unit, such as facility area (e.g., square footage), facility revenue, facility produced units, facility type (e.g., office, manufacturing, etc.), facility age, facility operating hours, facility employee count, facility HVAC type, facility location, and other types of data pertinent to demographics.

When resource consumption of a target unit/facility is not available, the control device can e.g. estimate the resource consumption based on comparable units/facilities within the entity or from a database comprising historic data or data from other industrial sites 1 comparable units/facilities outside of the entity. The control device executes the measuring value generation structure, matches the comparable facilities based on their demographic data in the database or carbon footprint inventory system 108. The control device can then automatically select a comparable facility, and determine resource consumption items of the selected comparable facility from database. The control device then can select a specific resource consumption item, as a processing unit 12, and determine a measured resource consumption of the target facility, and determines a measure of environmental impact from the measurement. Any report listing the estimated resource consumption, or the measure of environmental impact clearly designates the value as an estimate.

For the generation of the product $CO_2e$ quantification measure value 211 based on the monitored measuring parameters 134 measuring the $CO_2e$ intensity 22 of the product 2 processed or manufactured by the industrial site 1, emission factors can e.g. be classified and monitored by life cycle stage, wherein the classification of the emission factors comprise (a) for emitted raw material: acid, alkali, aluminum, argon, base oil, carton, ceramic abrasive, citric acid, demi water, ethanol, flocculant, glass abrasive, hydraulic fluid, isopropanol, Lubricant, magnesium, nitrogen, oxygen, paper, penetrant, polyester, refractory, salt, sodium fluoride, steel, sulphur dioxide, surfactant, water, or any other raw material as e.g. wheat and/or flour and/or vitamins and/or water etc.; and/or (b) for emitted waste materials: (i) energy emission: acetylene, diesel, electricity, solar power, fuel oil, natural gas, petrol, propane, (ii) waste material emission: aluminium incineration, aluminium recycling, electronics dismantling, hazardous waste incineration, mercury treatment, mineral oil incineration with energy recovery, municipal waste incineration, paperboard incineration, PET incineration, sludge incineration with energy recovery, and wood incineration; and (c) for transport emissions: transport by truck, and transport by ship.

For the generation of the final product 2 processed in the manufacturing site 1 the environmental quantification assessment can e.g. also include the impact on water depletion and use 1421 and land use as metric to assess impact on biodiversity 1422, 1423, e.g. agricultural land use per year per tonne of crop.

The product 2 assessments from raw material production to distribution can e.g. be implemented as part of the dynamic and (semi-)automated tool. This can include dynamic scenarios of emissions, water, and land use impact based on activity data from the specific raw material production.

As an embodiment variant, the control device 10 further provides third party certificates based on the generated product $CO_2e$ quantification measure value 21 and/or the generated industrial site $CO_2e$ quantification measure value 141. The third party certificates comprise ISO certificates. The third-party certificates can also be provided based on block-chain technology.

REFERENCE LIST

- 1 Industrial site or plant
  - 10 Control device
    - 101 Input section
      - 1011 I/O interface
      - 1012 Network interface
    - 102 Supervisory Control and Data Acquisition system (SCADA)
    - 103 Persistence storage
      - 1031 Non-volatile storage
      - 1032 Volatile storage
    - 104 Steering and control parameters (i.e. operating parameters of the industrial site of plant)
    - 105 Environmental footprint generation of the industrial site 1
    - 106 Environmental intensity impact of a product 2
    - 107 Environmental quantification module
      - 1071 $CO_2e$ quantification module
    - 108 Carbon footprint inventory system
      - 1081 Interface
      - 1082 Data capturing module
      - 1083 Setting module
      - 1084 Selection module
      - 1085 Material detector
      - 1086 Notification module
      - 1087 Data processing module
      - 1088 Displaying module
      - 1089 Verifying module
  - 11 Process line
    - 111 I/O devices
    - 112 Programmable Logic Controller (PLC)
    - 113 Manufacturing process
  - 12 Processing units
    - 121 Operational value settings
  - 13 Measuring devices and sensors
    - 131 Operational measuring devices of the processing units
    - 132 Environmental measuring devices
    - 133 Product characteristics measuring devices and/or sensors
    - 134 Measuring parameter
      - 1341 Operational measuring parameters of the processing units 12
      - 1342 Product characteristics measuring parameters
      - 1343 Environmental measuring parameters
        - 13431 Geographical location parameters
        - 13432 Temporal and/or seasonal parameters
        - 13433 Weather related parameters
  - 14 Environmental footprint or environmental impact intensity of the industrial site or plant
    - 141 $CO_2e$ quantification measure value of the industrial site or plant
    - 142 Further sustainability measuring parameters
      - 1421 Water use
      - 1422 Land use
      - 1433 Biodiversity
- 2 Product manufactured or processed by the industrial site 1
  - 21 Environmental impact intensity of a product 2
    - 211 Product $CO_2e$ quantification measure
    - 212 Further sustainability measuring parameters
      - 2121 Water use
      - 2122 Land use
      - 2123 Biodiversity
    - 213 Emission factors
      - 2131 Raw material
      - 2132 Waste
        - 21321 Energy emission
        - 21322 Waste material emission
      - 2133 Transport emission
    - 214 Materials of the product
      - **2141-214*i*** Specific material
        - **214*i*1 Weight of material 214*i***
        - **214*i*2 Weight proportion of material 214*i* to the total weight of materials 214**
        - **214*i*3 $CO_2e$ proportion of the $CO_2e$ exhausted from each material 2141-214*i* to the total $CO_2e$ exhausted from the product 2**
- 3 Environment of the industrial plant 1
- 4 Data transmission network

The invention claimed is:

1. A control device, comprising:

circuitry configured to monitor monitored measuring parameters, the measuring parameters including parameter vectors wherein parameter values of the parameter vectors are time series of parameter values changeable over a predetermined operation period, and/or parameter scalars, wherein the parameter values of the parameter scalars do not change throughout an entire operation period, and constructional parameter values which represent structural characteristics of an industrial site or plant;

circuitry configured to generate, based on the monitored measuring parameters, an environmental impact intensity value of a product measuring a CO2e intensity of the product which is processed by the industrial site or plant;

circuitry configured to classify and monitor, by a production cycle stage, emission factors based on the environmental impact intensity value of the product, emission factors which are classified (i) for raw material, (ii) for waste comprising emission factors for energy emission and emission factors for waste material emission, and (iii) for transport emissions, wherein the circuitry configured to monitor includes a material detector to detect materials of the product triggered by a measured weight of each material, and to generate a CO2e quantification of each material, wherein the product comprises a plurality of materials, the material detector further to detect a weight proportion which is a proportion of the weight of each material to the total weight of the product according to the weight of each material, and the material detector to measure a CO2e proportion which is a proportion of the CO2e exhausted from each material to the total CO2e exhausted from the product in a production cycle according to the CO2e quantification of each material, and circuitry configured to control, based on a measured industrial site environmental impact intensity value, operational value settings of operational parameters of the industrial site or plant until a specific measured value of the environmental impact intensity value of the product processed by the industrial site or plant is reached, wherein at least two of the operational parameters are varied within a parameter space of the operational parameters.

2. The control device according to claim 1, wherein:

based on the measured environmental impact intensity value of the product and/or the measured industrial site environmental impact intensity value of the industrial site or plant, the circuitry configured to control provides optimized measurements by mutual weighing impact of varying cost parameters and measures.

3. The control device according to claim 2, wherein:

the circuitry configured to control provides a dynamically adapted line configuration based on dynamically adapted operational value settings, based on a generated product impact strength quantification measure value, the circuitry configured to control dynamically varies operational parameters of the industrial site or plant until a specific measured value of an environmental footprint of the product processed by the industrial site or plant is reached.

4. The control device according to claim 1, wherein:

the circuitry configured to control, based on the measured environmental impact intensity value of the product and/or the measured industrial site environmental impact intensity value of the industrial site or plant, dynamically varies operational parameters of the industrial site or plant adapting the operation of units of the industrial site or plant until a specific measured value of the environmental impact intensity of the industrial site or plant and/or of the product processed by the industrial site or plant is reached.

5. The control device according to claim 4, wherein:

the operational parameters of the industrial site or plant are dynamically varied by varying the operational parameters applying simulated annealing to the parameter space of the operational parameters.

6. The control device according to claim 4, wherein:

the at least two of the operational parameters within the parameter space are stochastically varied until an optimized $CO_2$-footprint measurand is measured.

7. The control device according to claim 4, wherein:

the at least two of the operational parameters within the parameter space are varied electronically until a predefined threshold value for a measured $CO_2$-footprint is triggered.

8. The control device according to claim 1, wherein:

the industrial site comprises at least one industrial plant and/or processing line and/or production facility/equipment.

9. The control device according to claim 1, wherein:

the circuitry configured to control comprises at least one programmable logic controller or programmable controller associated with the industrial site as automation controllers adapted for the control of a manufacturing process or product processing process at the industrial site, the control device further comprising programmable logic controller input and output devices which are integral with a data processor or rack-mounted as modular devices.

10. The control device according to claim 9, wherein:

the at least one programmable logic controller is connected over a data transmission network to a supervisory control and data acquisition system of the control device providing programming and process fault diagnosis of processing units of the industrial site.

11. The control device according to claim 1, wherein:

the industrial site comprises one or more process lines comprising at least one processing unit for processing or manufacturing the product.

12. The control device according to claim 1, wherein:

for the generation of the CO2e quantification based on the monitored measuring parameters measuring the CO2e intensity of the product processed or manufactured by the industrial site, emission factors are classified and monitored by produced emission factors of raw materials, processing and transport of the product by production cycle stage, wherein the classification of the emission factors comprise (a) for emitted raw material: wheat and other crops, water, acid, alkali, aluminum, argon, base oil, carton, ceramic abrasive, citric acid, demi water, ethanol, flocculant, glass abrasive, hydraulic fluid, isopropanol, lubricant, magnesium, nitrogen, oxygen, paper, plastic and other packaging materials, penetrant, polyester, refractory, salt, sodium fluoride, steel, sulphur dioxide, surfactant, water; and/or (b) for emitted waste materials: (i) energy emission: acetylene, diesel, electricity, solar power, fuel oil, natural gas, petrol, propane, (ii) waste material emission: aluminum incineration, aluminum recycling, electronics dismantling, hazardous waste incineration, mercury treatment, mineral oil incineration with energy recovery, municipal waste incineration, paperboard incineration, PET incineration, sludge incineration with energy recovery, and wood incineration; and (c) for transport emissions: transport by truck, and transport by ship.

13. The control device according to claim 1, wherein:

the circuitry configured to monitor monitored measuring parameters is associated with processing units measuring or capturing the operational parameters and being associated with the industrial site or plant measuring environmental measuring parameters of the industrial site or plant.

* * * * *